United States Patent
Laracey

(10) Patent No.: US 9,208,482 B2
(45) Date of Patent: Dec. 8, 2015

(54) TRANSACTION TOKEN ISSUING AUTHORITIES

(71) Applicant: PAYPAL, INC., San Jose, CA (US)

(72) Inventor: Kevin Laracey, Natick, MA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/169,067

(22) Filed: Jan. 30, 2014

(65) Prior Publication Data

US 2014/0149293 A1 May 29, 2014

Related U.S. Application Data

(63) Continuation-in-part of application No. 12/846,911, filed on Jul. 30, 2010, now Pat. No. 8,380,177, and a continuation-in-part of application No. 13/336,574, filed on Dec. 23, 2011, now Pat. No. 8,632,000, and a continuation-in-part of application No. 13/731,348, filed on Dec. 31, 2012, and a continuation-in-part of application No. 13/768,156, filed on Feb. 15, 2013.

(60) Provisional application No. 61/758,543, filed on Jan. 30, 2013, provisional application No. 61/362,567, filed on Jul. 8, 2010, provisional application No. 61/322,477, filed on Apr. 9, 2010.

(51) Int. Cl.
| | |
|---|---|
| *G06Q 20/10* | (2012.01) |
| *G06Q 20/20* | (2012.01) |
| *G06Q 20/32* | (2012.01) |
| *G06Q 30/06* | (2012.01) |
| *G06Q 30/02* | (2012.01) |
| *G06Q 20/38* | (2012.01) |
| *G06Q 20/40* | (2012.01) |
| *G06Q 20/42* | (2012.01) |

(52) U.S. Cl.
CPC .............. *G06Q 20/108* (2013.01); *G06Q 20/20* (2013.01); *G06Q 20/3276* (2013.01); *G06Q 20/385* (2013.01); *G06Q 20/4037* (2013.01); *G06Q 20/42* (2013.01); *G06Q 30/0253* (2013.01); *G06Q 30/06* (2013.01)

(58) Field of Classification Search
USPC .................................................. 235/375, 379
See application file for complete search history.

(56) References Cited

U.S. PATENT DOCUMENTS

| | | |
|---|---|---|
| 5,739,512 A | 4/1998 | Tognazzini |
| 7,040,533 B1 | 5/2006 | Ramachandran |

(Continued)

FOREIGN PATENT DOCUMENTS

| | | |
|---|---|---|
| EP | 1 264 259 B1 | 2/2007 |
| JP | 2002-032686 A | 1/2002 |

(Continued)

OTHER PUBLICATIONS

Laracey, Kevin "Japanese Office Action", dated Jul. 29, 2014, for Japanese Patent Application No. 2013-546454, entitled: Mobile Phone ATM Processing Methods and Systems, 5pgs.

(Continued)

*Primary Examiner* — Christle I Marshall
(74) *Attorney, Agent, or Firm* — Haynes and Boone, LLP

(57) ABSTRACT

Systems, methods, apparatus, processes, and computer program code for conducting transactions are described which allow a first party to a transaction to identify a second party to a transaction. In one or more embodiments, a mobile device may be operated to conduct transactions with merchants, service providers, and other devices, such as automated teller machines (ATMs). A transaction token issuing authority associated with a merchant or point of transaction may be determined such that the mobile device may communicate with the appropriate entity or entities to conduct a transaction.

35 Claims, 6 Drawing Sheets

(56) References Cited

U.S. PATENT DOCUMENTS

| | | |
|---|---|---|
| 7,379,921 B1 | 5/2008 | Kiliccote |
| 7,483,858 B2 | 1/2009 | Foran et al. |
| 7,992,776 B1 | 8/2011 | Ramachandran et al. |
| 2003/0004737 A1 | 1/2003 | Conquest et al. |
| 2005/0203854 A1 | 9/2005 | Das et al. |
| 2006/0105742 A1 | 5/2006 | Kim et al. |
| 2006/0206709 A1 | 9/2006 | Labrou et al. |
| 2007/0295805 A1 | 12/2007 | Ramachandran |
| 2008/0034221 A1 | 2/2008 | Hammad et al. |
| 2008/0048022 A1 | 2/2008 | Vawter |
| 2008/0052226 A1* | 2/2008 | Agarwal et al. ............... 705/39 |
| 2008/0078831 A1 | 4/2008 | Johnson et al. |
| 2008/0086766 A1* | 4/2008 | Kaler et al. ................. 726/9 |
| 2008/0222048 A1 | 9/2008 | Higgins et al. |
| 2008/0313456 A1* | 12/2008 | Menadue et al. ............ 713/156 |
| 2009/0164796 A1* | 6/2009 | Peirce ........................ 713/186 |
| 2009/0254479 A1 | 10/2009 | Pharris |
| 2010/0017327 A1 | 1/2010 | Treadwell et al. |
| 2010/0125510 A1 | 5/2010 | Smith et al. |
| 2011/0055084 A1 | 3/2011 | Singh |
| 2011/0066550 A1 | 3/2011 | Shank et al. |
| 2011/0238573 A1 | 9/2011 | Varadarajan |
| 2011/0251892 A1 | 10/2011 | Laracey |
| 2012/0187187 A1 | 7/2012 | Duff et al. |
| 2013/0110654 A1 | 5/2013 | Kobres |
| 2013/0110676 A1 | 5/2013 | Kobres |
| 2013/0110717 A1 | 5/2013 | Kobres |
| 2013/0110727 A1 | 5/2013 | Kobres |
| 2013/0110728 A1 | 5/2013 | Kobres |
| 2013/0124411 A1 | 5/2013 | Kobres et al. |
| 2013/0132234 A1 | 5/2013 | Grossi et al. |
| 2014/0054367 A1* | 2/2014 | Alexeev ..................... 235/375 |

FOREIGN PATENT DOCUMENTS

| | | |
|---|---|---|
| JP | 2002109421 A | 4/2002 |
| JP | 2003-141402 A | 5/2003 |
| JP | 2004-246536 A | 9/2004 |
| JP | 2004-326348 A | 11/2004 |
| JP | 2005-157426 A | 6/2005 |
| JP | 2005276023 A | 10/2005 |
| JP | 2006-99713 A | 4/2006 |
| JP | 2006-243842 A | 9/2006 |
| JP | 2006-277715 A | 10/2006 |
| JP | 2007-034941 A | 2/2007 |
| JP | 20070299316 A | 11/2007 |
| JP | 2008-129787 A | 6/2008 |
| JP | 2008-217277 A | 9/2008 |
| JP | 2008-242828 A | 10/2008 |
| JP | 2009-080729 A | 4/2009 |
| JP | 2009-276838 A | 11/2009 |
| KR | 2006-0084520 A | 7/2006 |
| KR | 1020100018744 A | 2/2010 |
| KR | 20110039946 A | 4/2011 |
| KR | 10-2011-0053216 | 5/2011 |
| KR | 10-2012-0103924 | 9/2012 |
| KR | 10-2013-0000072 | 1/2013 |
| WO | 01/63546 A1 | 8/2001 |
| WO | 2008-153096 A1 | 12/2008 |
| WO | 2010/035224 A2 | 4/2010 |
| WO | 2010/125577 A1 | 11/2010 |
| WO | WO-2013-009063 | 1/2013 |

OTHER PUBLICATIONS

Laracey, Kevin "English-language Translation of Japanese Office Action", dated Jul. 29, 2014, for Japanese Patent Application No. 2013-546454, entitled: Mobile Phone ATM Processing Methods and Systems, 6pgs.

Communication: "The Extended European Search Report", dated Mar. 27 Jun. 2014, European Patent Office, for European Application No. 11766781.6-1055 2556477, International Application No. PCT/US2011/031696, 7pgs.

Laracey, Kevin "Japanese Office Action", dated Aug. 21, 2014, for Japanese Patent Application No. 2013-503978, entitled: Mobile Phone Payment Processing Methods and Systems, 3pgs.

Laracey, Kevin "English-language Translation of Japanese Office Action", dated Aug. 21, 2014, for Japanese Patent Application No. 2013-503978, entitled: Mobile Phone Payment Processing Methods and Systems, 5pgs.

European Patent Office, "Communication: Extended European Search Report", Jun. 3, 2014, European Application No. 11766781.6-1955 / 2556477, International Application No. PCT/US2011/031696, 7pgs.

European Patent Office, "Communication: Extended European Search Report", Jun. 3, 2014, European Application No. 11851732.5-1958 / 2656292, International Application No. PCT/US2011/067197, 6pgs.

News Releases in 2006, "Bill Paying by Mobile Phone Using Barcode Capture", Nov. 8, 2006, NTT Data Corporation, 4pgs.

"European Communication pursuant to Rule 114(2) EPC", European Patent Office, Oct. 30, 2013, European Application No. 11766781.6-1955 / 2556477, International Application No. PCT/US2011/031696, 8pgs.

"Notification of Transmittal of the International Search Report and the Written Opinion of the International Searching Authority or the Declaration", dated Aug. 14, 2012, for PCT Application No. PCT/US2011/067197, 16pgs.

"Japanese Office Action", dated Dec. 9, 2013, for Japanese Application No. 2013-503978, 8pgs.

"PCT Notification of Transmittal of the International Search Report and the Written Opinion of the International Searching Authority, or the Declaration", dated Sep. 13, 2013, for International Application No. PCT/US2013/040953, 13pgs.

"PCT Notification of Transmittal of the International Search Report and the Written Opinion of the International Searching Authority, or the Declaration", dated Sep. 13, 2013, for International Application No. PCT/US2013/042714, 10pgs.

"PCT Notification of Transmittal of the International Search Report and the Written Opinion of the International Searching Authority, or the Declaration", dated Dec. 7, 2011, for International Application No. PCT/US2011/031696, 11pgs.

"Notification Concerning Transmittal of International Preliminary Report on Patentability, Chapter I of the Patent Cooperation Treaty", Nov. 27, 2014, for International Application No. PCT/US2013/040953, 10 pgs.

Search Report and Written Opinion of the International Search Authority, May 20, 2014, 15 pages, Serial No. PCT/US2014/013955.

* cited by examiner

TRANSACTION TOKEN ISSUING AUTHORITIES

CROSS REFERENCE TO RELATED APPLICATIONS

The present application is based on, and claims benefit of and priority to, U.S. Provisional Patent Application Ser. No. 61/758,543 (filed on Jan. 30, 2013), and is a continuation-in-part of U.S. patent application Ser. No. 12/846,911 (filed on Jul. 30, 2010), which claims priority to U.S. Patent Application No. 61/362,567 (filed on Jul. 8, 2010) and 61/322,477 (filed on Apr. 9, 2010), and is a continuation-in-part of U.S. patent application Ser. No. 13/336,574 (filed on Dec. 23, 2011), and a continuation-in-part of U.S. patent application Ser. No. 13/731,348 (filed on Dec. 31, 2012) and a continuation-in-part of U.S. patent application Ser. No. 13/768,156 (filed on Feb. 15, 2013), the contents of each of which are hereby incorporated by reference in their entirety for all purposes.

BACKGROUND

Recently, payment systems and payment approaches have been proposed in which users may conduct transactions using mobile devices. In certain approaches, such as those proposed by the assignee of the present invention, users may conduct transactions using mobile devices having a mobile payment application thereon. In the proposed transactions, a "token" (such as a checkout token, or ATM token) may be captured or communicated to the mobile device. The token is used by a transaction management system to facilitate completion of the transaction between the user of the mobile device and the transaction location. For example, the transaction management system may use information associated with the token to identify the merchant (or the consumer) associated with the transaction location and to identify pending transaction information associated with the transaction location.

In some embodiments of the system introduced by the assignee of the present invention, a token is used to link two entities that wish to engage in a transaction. The system described can be used to replace the use of a magnetic stripe card and reader, which in the case of purchase transactions is used to link together, for example, a purchase transaction that is pending in a checkout lane at a store with the payment credentials of a consumer who wishes to pay the merchant for the goods associated with the pending transaction.

The transaction could be a purchase transaction, an ATM transaction, a money transfer transaction, or an authentication transaction, a check in process, or any other transaction where information needs to be exchanged between two entities. In some embodiments it is a merchant and a buyer, in others it is two people, and in others it could be a person wanting to make their presence known to a retailer so that a gas pump can be automatically turned on, or so that a bartender at a bar can know to automatically prepare their favorite drink.

It would be desirable to provide systems and methods which allow multiple transaction management systems to be involved in transactions. Further, it would be desirable to allow multiple entities or systems to perform different transaction management functions while still enabling users of mobile devices to conduct transactions in an efficient and reliable manner.

Further, it would be desirable to allow a device involved in a transaction to easily identify the appropriate transaction management system as well as the correct path or communication channel to use to communicate with the appropriate transaction management system for each transaction. For example, in transactions in which a mobile device captures a token associated with a point of transaction, the mobile device may perform processing to identify the appropriate transaction management system for use in the transaction based on information received from the token. As another example, in transactions in which a transaction terminal captures a checkout token from a mobile device, the transaction terminal may perform processing to identify the appropriate transaction management system for use in the transaction based on information received from the token.

DESCRIPTION

Embodiments of the present invention relate to systems, methods, processes, computer program code, and means for conducting transactions. More particularly, some embodiments relate to systems, methods, processes, computer program code and means for operating a mobile device to conduct transactions with merchants, services providers and other devices (such as automated teller machines or "ATMs"). Pursuant to some embodiments, systems, methods, processes, computer program code and means for operating a mobile device to conduct a transaction includes determining a transaction token issuing authority associated with a merchant or point of transaction such that the mobile device may communicate with the appropriate entity (or entities) to conduct a transaction. In general, embodiments may be deployed in conjunction with a system such as that described by the inventors in their co-pending and commonly assigned applications referenced above in which mobile devices may be used to conduct transactions by scanning, capturing, or otherwise entering a code associated with a transaction. Features of some embodiments will be described in conjunction with a payment system in which a mobile device is used to conduct a transaction at a merchant location or point of interaction (or, in some embodiments, at an automated teller machine, a kiosk, or the like).

Pursuant to some embodiments, multiple transaction management systems (or remote transaction management devices) may be associated with or used in a payment system of the present invention. For example, a first merchant may utilize the services of a first transaction management system to process transactions, while a second merchant may utilize the services of a second transaction management system to process transactions. A consumer who carries a mobile payment device with a mobile payment application according to the present invention, need not necessarily know which transaction management system each merchant uses. However, pursuant to some embodiments, the mobile payment application on the mobile device must know which transaction management system to communicate with during transactions associated with the present invention. Embodiments described herein provide techniques for allowing the mobile payment application on a mobile device to determine which transaction management system to communicate with in order to conduct a payment transaction. Further, embodiments may also be used in situations where the merchant systems need to determine, based on information received from a mobile device, the appropriate transaction management system to communicate with. The result is a system which allows multiple transaction management systems to be involved in a payment system. Further, there may be multiple layers or sets of systems or entities that perform aspects of a transaction management system, each of which may refer to other systems or entities as described further herein.

Figure 2:
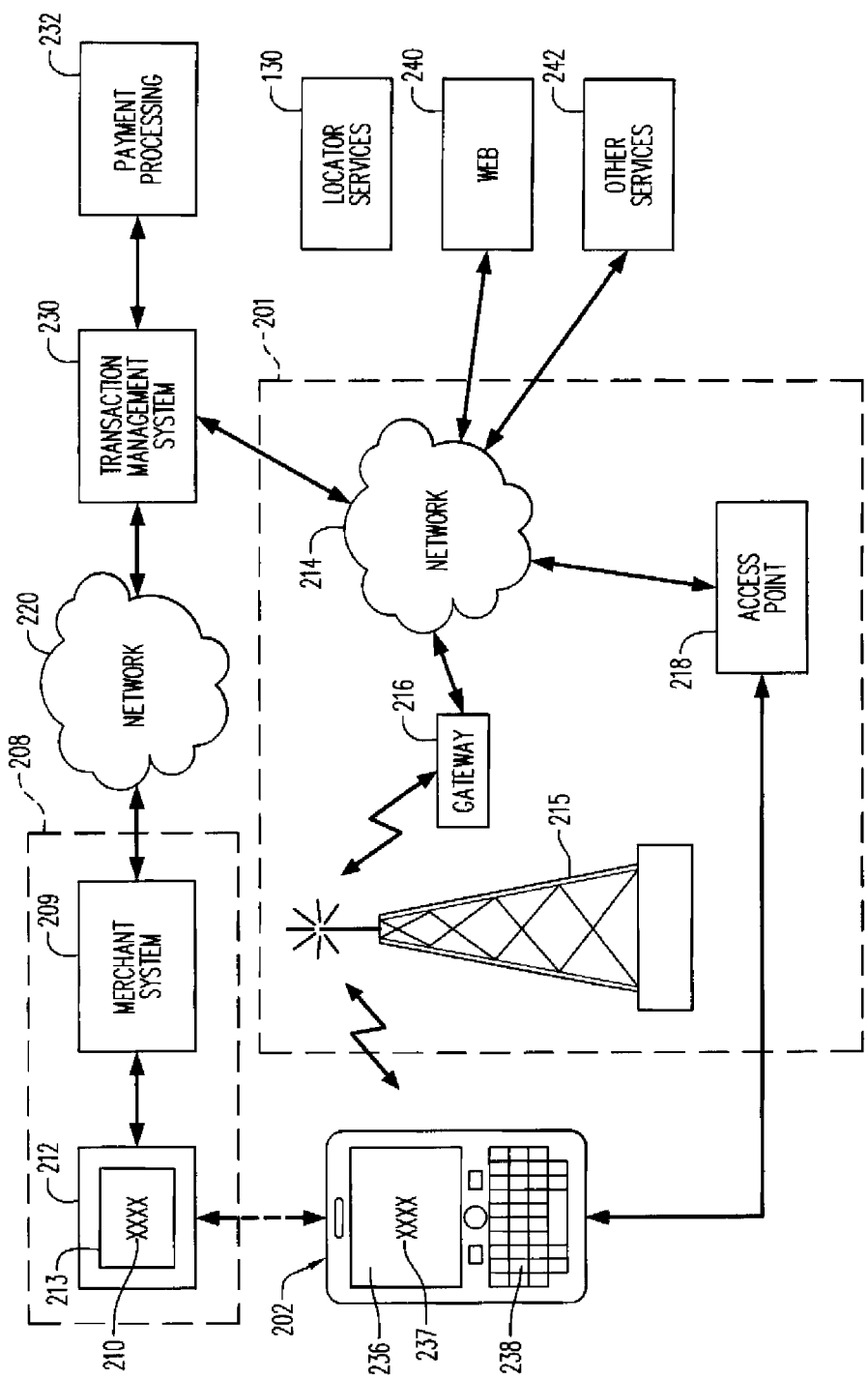
FIG. 2 is a block diagram depicting portions of the system of FIG. 1 configured pursuant to some embodiments.
Figure 3:
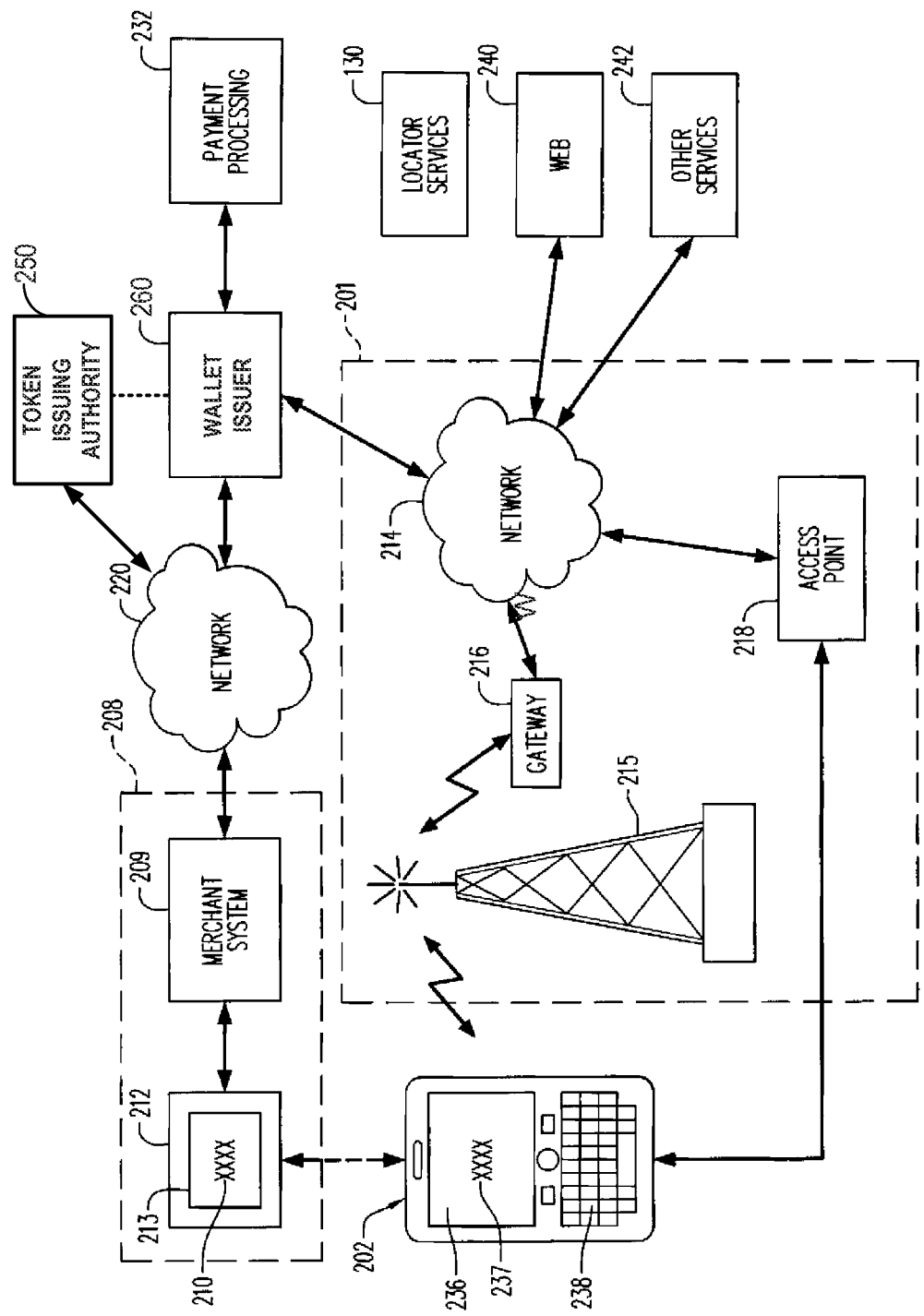
FIG. 3 is a block diagram depicting portions of a system configured pursuant to some embodiments.
Figure 4:
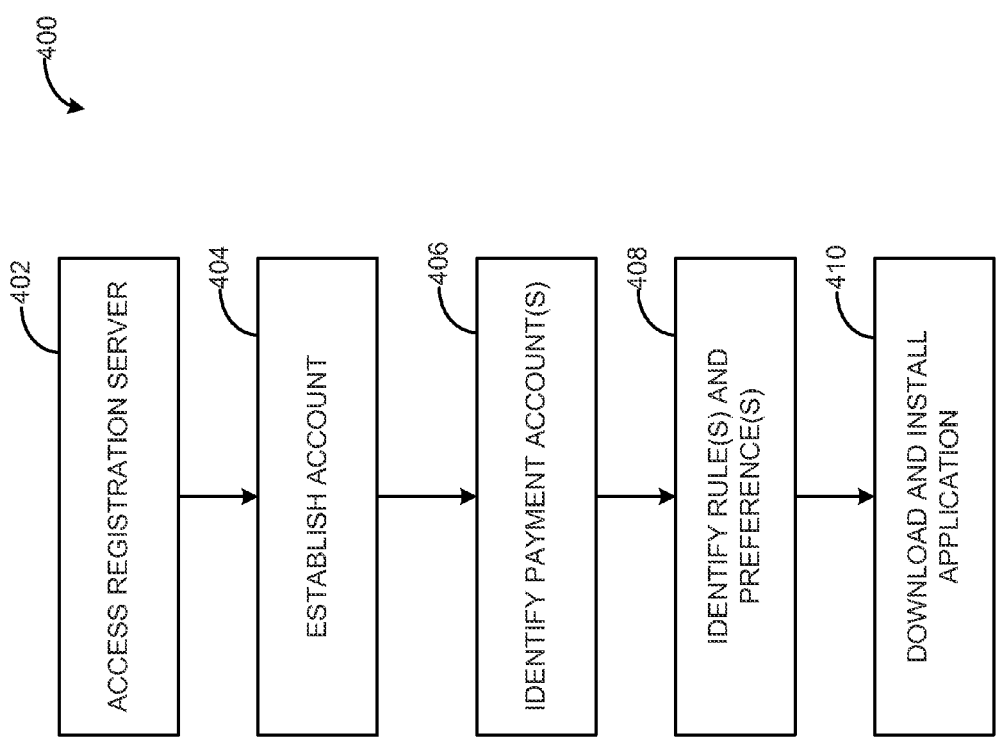
FIG. 4 is a flow diagram depicting a process pursuant to some embodiments.
Figure 5:
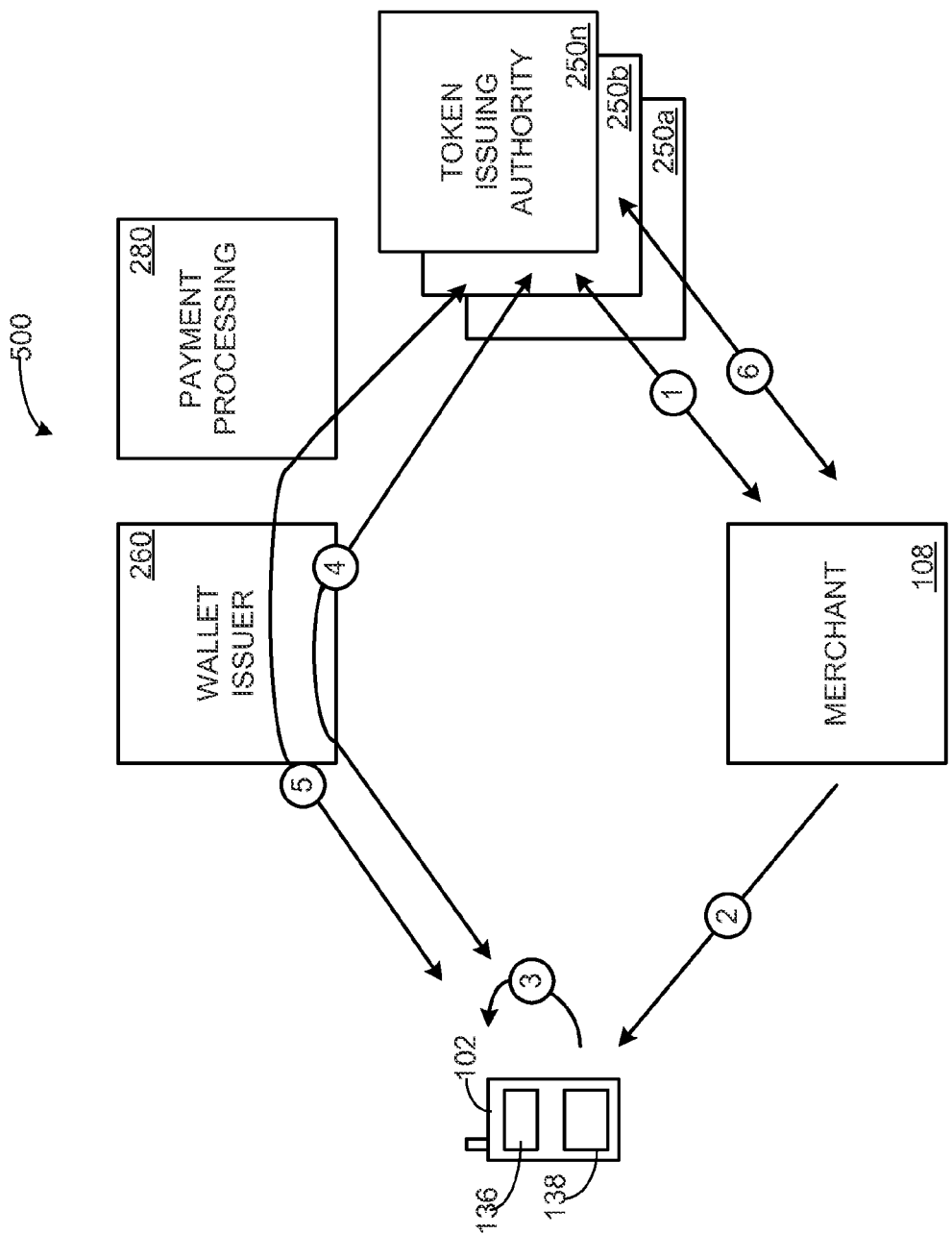
FIG. 5 is a block diagram depicting portions of a system configured pursuant to some embodiments.

Pursuant to some embodiments, the functions of a transaction management system may be performed by multiple entities or systems. For example, one or more wallet issuers may perform functions such as user authentication and basic transaction management functions. One or more token issuing authorities may perform functions such as merchant authentication and basic transaction management functions. In such embodiments, when a consumer operates a mobile device to conduct a transaction with a merchant, the mobile device (and/or the mobile device operating in conjunction with a wallet issuer) must determine which token issuing authority issued a token on behalf of the merchant so that the transaction can be conducted between the consumer (operating the mobile device) and the merchant. Embodiments allow such transactions to be conducted. Other features and benefits will become apparent from the following disclosure in which an initial description of transactions will be provided by reference to FIG. 1 (where multiple transaction management systems may be involved in transactions). Further transaction details will be provided in FIG. 2 (where multiple transaction management systems may be involved). In FIG. 3, transaction details are described where some of the functions of a transaction management system are performed by one or more token issuing authorities and one or more wallet issuers. In FIG. 4, a wallet registration process is described (which may be performed between a user who wishes to configure a mobile payment application on a mobile device and a transaction management system or a wallet issuer). In FIG. 5, further details of a transaction process are described for situations where one or more wallet issuers and one or more token issuing authorities are involved in a transaction.

A number of terms are used herein for convenience and ease of exposition. For example, the term "point of transaction" will be used to generally refer to an entity, device or other object with which a user operating a mobile device wishes to transact. For example, a "point of transaction" may be a point of sale terminal at a merchant, a merchant website, an ATM, a kiosk, another individual, an item with an identifier such as a QR code printed on it, or an item or object containing a wireless device or beacon such as a Bluetooth beacon, NFC chip, audio device, or other device that can be used to initiate a transaction when working in conjunction with another device, or the like. Without limiting the foregoing, and for convenience, as used herein, a "point of transaction" may also be referred to simply as a "merchant".

The term "token" will be used to refer to an identifier or information that is exchanged between devices involved in a transaction. For example, a token may be provided by a merchant point of transaction to a mobile device during or associated with a transaction involving the merchant and the mobile device. As another example, a token may be provided by an ATM to a mobile device during or associated with a transaction involving the ATM and the mobile device. As still another example, a token may be provided by a customer to a point of interaction to initiate a transaction. A token may be provided in a number of different forms as will be described further herein. A token may be issued for use in a transaction in a number of different ways. For example, as will be described further herein, a token may be issued, generated or otherwise provided by a transaction management system or a "token issuing authority".

The term "capture" will be used to refer to the act of scanning, reading or other obtaining of a "token" (an identifier used to facilitate transactions pursuant to some embodiments). The term "capturing" (or "captured") is not intended to be limiting, and is intended to encompass embodiments where a mobile device is operated to receive a token (or data associated with a token) via key entry, via image capture, via RFID reading, BLE/Bluetooth, NFC, and using other scanning, reading, or other wired or wireless techniques described herein. Pursuant to some embodiments, the term "capture" further includes any decoding or image processing of a token required to retrieve or otherwise obtain information from the token.

As another example, the term "wireless" is used to refer to unwired remote communication techniques, such as, for example, using radio frequency or other electromagnetic radiation based communication techniques (including RFID, wifi, Bluetooth/BLE, zigbee or other techniques). Those skilled in the art, upon reading this disclosure, will appreciate that the use of these terms is not intended to be limiting, but for the purposes of exposition.

As another example, the term "transaction management system" refers to a system operated by an entity to facilitate transactions involving mobile devices and merchants, ATMs, or other devices. In general, a transaction management system may be a transaction management system such as described in U.S. Pat. Nos. 8,632,000 and 8,380,177. In general, a transaction management system may be a system which matches pending transaction information received from one device (such as a point of transaction, a mobile device, or an item) associated with a first party with information received from another device (such as a mobile device, a point of transaction, or the like) associated with a second party. Pursuant to some embodiments, the transaction management system performs the matching using, at least in part, a token (such as a checkout token or ATM token). Once the pending transaction information is matched with the user information, further processing may be performed to allow selection or identification of an appropriate or desired payment account to be used to complete the transaction. In some embodiments, the transaction management system may perform other functions. For example, a transaction management system may perform user and mobile device authentication processing. A transaction management system may also be used to issue tokens for use in conducting transactions.

As used herein, a "transaction management system" may also be used to detect the presence of a user or device at a given venue and take actions on their behalf. For example, upon a user's device determining via a Bluetooth beacon capability that broadcasts a token and which is located near a particular retailer (where the token may be used to determine the user's location on its own or in conjunction with geolocation capabilities on the user's device), ATM or other point of interaction, the transaction management system may check the user associated with a given device in with one or more points of interaction at that location. Checking in means that the point of interaction system receives some profile information about the user, such as their name, nickname, picture, loyalty program number, preferences for goods and services that they frequently purchase. In addition, the check-in process can result in the point of interaction or personnel at the point of interaction executing transactions on behalf of the user, such as automatically performing a pre-authorization on a payment instrument for a predetermined amount so that a gas station pump (point of interaction) is ready for them to begin pumping gas, or to prompt a bartender to automatically begin preparing a particular drink or have kitchen staff begin preparing the user's favorite meal.

In some embodiments, the functions performed by a transaction management system may be performed by separate entities. For example, as used herein, a "wallet issuer" may perform functions such as authentication of a user and a mobile device as well as certain transaction processing functions. As used herein, a "token issuing authority" or "token issuer" is used to refer to an entity, system or device that may perform functions such as authentication and communication with a merchant, ATM or other point of interaction as well as certain transaction processing functions. As used herein, the term "directory service" may be used to refer to a service performed by or on behalf of any of a transaction management system, a token issuing authority, and a wallet issuer (or other entity). A "directory service" may provide a service to allow a lookup or mapping function to be performed (e.g., based on a token) to determine which entity or entities a device (such as a mobile device or a merchant) should communicate with to perform transaction processing as described herein. Details of such functions will be provided further below.

Features of the present invention will be described assuming the use of the payment systems described in our co-pending applications referenced above, and the details of those systems will not be fully reiterated herein. However, embodiments of the present invention are not limited to use in conjunction with the payment systems described in our co-pending applications.

Figure 1:
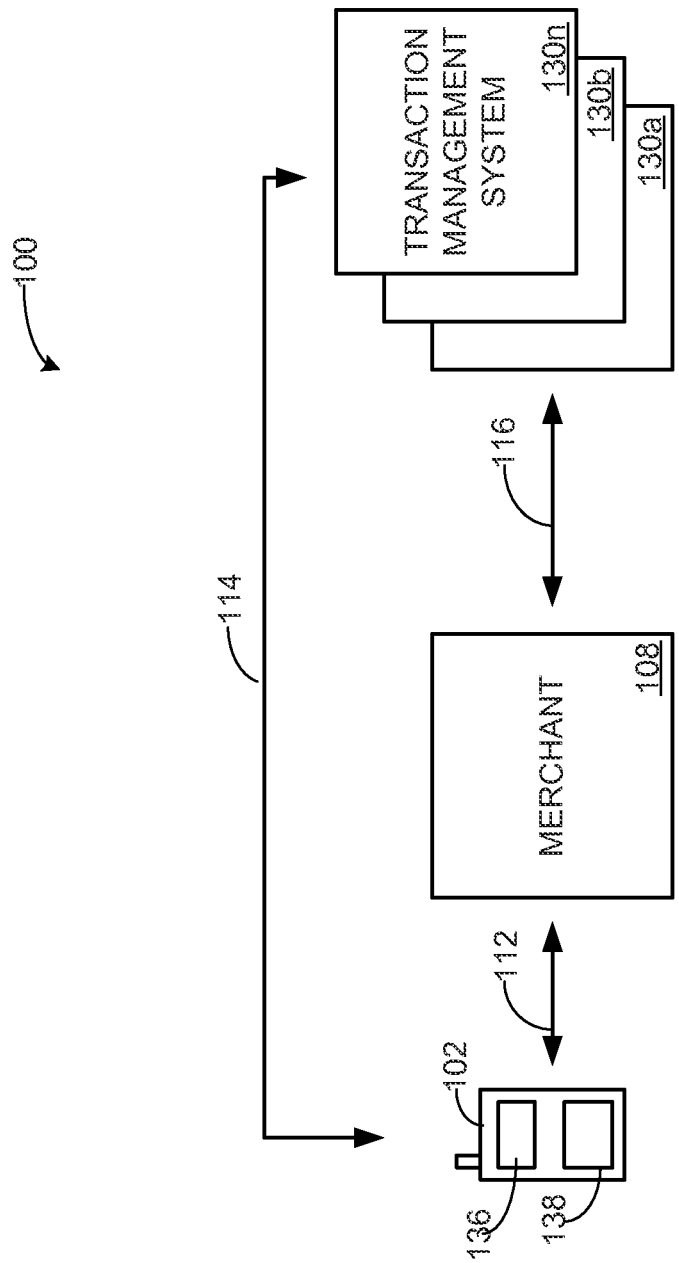
FIG. 1 is a block diagram depicting portions of a system configured pursuant to some embodiments.

Features of some embodiments of the present invention will now be described by reference to FIG. 1, which is a block diagram of a system 100 pursuant to some embodiments. More particularly, FIG. 1 is a block diagram of a system where multiple transaction management systems 130a-n are used. Each transaction management system 130 may perform functions as described herein, or other functions that allow a mobile payment application transaction to be processed in situations where different transaction systems are involved. In such a system, there may be circumstances where a transaction at one merchant may require interaction with a first transaction management system, and a transaction at a second merchant may require interaction with a second transaction management system. Embodiments as depicted in FIG. 1 allow the use of such multiple transaction management systems. Before a description of how multiple transaction management systems, wallet issuers and/or token issuing authorities will be used, a review of how transactions may be processed will be provided. Further details of different types of transactions and transaction processing may be obtained by reference to the commonly assigned patents and applications incorporated by reference herein.

For convenience, various transactions will be described by reference to the payment system 100 of FIG. 1, and for simplicity, will first be described in situations where a single transaction management system 130 is utilized. As shown, a payment account holder, buyer, or other user or operator (hereafter, the "customer") may have or use a mobile device 102 (such as a mobile telephone or the like). The mobile device 102 has a display screen 136 and a data entry device 138 (such as a keypad or touch screen). Pursuant to embodiments of the present invention, the customer may use the mobile device 102 to conduct a transaction with a merchant 108 (such as a payment, loyalty, return, or other transaction). The merchant 108 may be a physical storefront, electronic commerce merchant, or mail order and telephone ("MOTO") merchant (or another person or entity, or any other object capable of working in conjunction with the customer and/or the customer's device to initiate a transaction). Further, the merchant 108 need not be a "merchant", but may also be another individual (in the case of person to person transactions), or a kiosk or other unattended device (such as an automated teller machine ("ATM")) or the like.

In a typical example transaction, a customer may purchase products or services from the merchant 108 by first taking the products or services to a point of sale (e.g., such as a physical checkout counter, an electronic shopping cart, or the like, generally referred to herein as the "point of sale" or "POS"). The merchant 108 begins the checkout transaction as normal, by totaling the items to be purchased (e.g., by using a bar code scanner, key entry of product codes, or the like). The merchant (acting through a clerk, a display screen, a POS terminal facing the customer, or the like) then prompts the customer to select a payment option. In prior systems, the merchant might prompt the customer to select "credit", "debit" or another payment option. Pursuant to the present invention, the merchant (acting through a clerk, display screen, a POS terminal facing the customer, or the like) may prompt the customer for those options as well as a mobile payment option. If the customer selects the mobile payment option, features of the present invention are utilized to process the transaction.

In some embodiments, rather than requiring the customer to select the mobile payment option by an action (such as by pushing a button on a POS terminal or communicating the choice to a clerk, etc.), the choice may be made by the customer's act of scanning, capturing or entering a checkout identifier or "token" (as discussed below). For example, in such embodiments, the action of capturing the token used in the present invention will cause the transaction to proceed pursuant to the present invention.

If the mobile payment option is selected, and once the purchase total has been generated, the merchant 108 transmits a merchant payment authorization request message to a transaction management system 130 (via path 116). The merchant payment authorization request message may include one or more pieces of data or information about the transaction. For example, the message may include one or more of a merchant identifier, the amount due, and a token which, as will be described further herein, is used to identify the merchant and the transaction for further processing.

A number of techniques may be used to generate or present the token. For example, in some embodiments, one or more tokens may be predefined or established for use with a given merchant 108 (e.g., the merchant 108 could have a number of checkout tokens available to display or present at the point of sale). In such embodiments, the merchant 108 would choose a token for use with a given transaction. In some embodiments, such tokens may be generated or provided using a standardized format. As an illustrative example, a merchant 108 may be issued or provided with a range of tokens or a predefined series or sequencing of numbers. As a specific example, a merchant may be instructed to use a range of numbers (e.g., from "00000" to "99999") as well as a sequencing or usage pattern (e.g., a specific checkout token may only be used in conjunction with a single active transaction). In such an embodiment, the POS system would pass a selected token to the transaction management system 130. In other embodiments, however, the tokens are issued or selected by the transaction management system 130 and are provided to the merchant 108 in response to a merchant authorization request message (as will be described further below). Those skilled in the art will recognize that other techniques for issuing, using and selecting tokens may be used. In some embodiments, as will be described further below, a token may be issued by a "token issuing authority".

Pursuant to some embodiments, the token is dynamically generated for each transaction. In some embodiments, the token is a static identifier associated with an individual checkout location (e.g., such as a specific point of sale terminal or location, a specific ATM machine or other device, or with a small business person such as a plumber or electrician who has no specific checkout location, or with an individual). The merchant 108 causes the token to be displayed or presented to the customer. For example, the token may be displayed on a display device associated with the merchant, or pre-printed on a placard or other display near the point of sale.

From the customer perspective, the payment process of the present invention may begin with the customer performing an authentication process to confirm their identity and authority to conduct transactions using the present invention. The authentication process may be performed after, or in some situations, prior to the customer's selection of the mobile payment option at the point of sale. Pursuant to some embodiments, the authentication process serves to authenticate the customer to the transaction management system 130. The authentication process may involve the customer launching a mobile payment application or a Web browser on the mobile device 102 and providing one or more credentials or items of information to the transaction management system 130 via communication path 114. For example, the authentication process may involve the entry of a user identifier, a password, or other credentials into a login screen or other user interface displayed on a display device 136 of the mobile device 102. The transaction management system 130 compares the received information with stored information to authenticate the customer. As will be described further herein, different transaction management systems 130*a-n* may be involved, and different mobile devices may interact with different transaction management systems 130*a-n* to perform this authentication process. Further, in some embodiments, the function of performing authentication may be performed by an entity that issued the mobile payment application used by the consumer. Such an entity may be referred to herein as a "wallet issuer".

The authentication process, in some embodiments, also involves the comparison of one or more attributes of the mobile device 102 with a stored set of attributes collected from the mobile device 102 during a registration process (such as the process of FIG. 3). For example, the attributes may include identifiers associated with the mobile device 102 which uniquely identify the device. In this way, the customer is authenticated two ways—with something they know (login credentials), and something they have (mobile device). Once the customer is successfully authenticated, then the system has access to a variety of attributes about the customer, including a list of payment accounts that the customer previously identified to the transaction management system 130 as part of the registration process. In some embodiments, as will be described further herein, the authentication process is performed between a mobile device 102 and a wallet issuer.

After a successful authentication process, the customer is prompted to scan, capture (or otherwise enter) a token from a device associated with the merchant 108 (shown as interaction 112 between the mobile device 102 and the merchant 108). The token is used, as will be described further herein, to link messages from the mobile device 102 and the merchant 108, and the transaction management system 130, so that transactions pursuant to the present invention may be accomplished. After capture of the token, the mobile device 102 transmits the token to the transaction management system 130 in a customer transaction lookup request message (over communication path 114). The customer transaction lookup request message includes the token captured by the mobile device 102.

Pursuant to some embodiments, either a "static" token or a "dynamic" token may be used. In an embodiment where a "static" token is used (e.g., such as one that is assigned for use by a specific point of transaction location and which does not include any variable information for each transaction), the transaction management system 130 matches the information in the customer transaction lookup request (received from the mobile device 102) with the information in the merchant payment authorization request (received from the merchant 108) by matching the token information received in each of the messages. Once a match is found, the transaction management system 130 transmits a transaction detail message (via path 114) to the customer's mobile device 102. The information from the transaction detail message provides the customer with details about the transaction, including but not limited to the amount due, the name and location of the merchant (information contained in or derived from the merchant payment authorization request), and possibly one or more marketing messages. In addition, the transaction management system 130 may also send to the phone a list of payment accounts the customer has registered with the system, including credit, debit, checking, prepaid and other types of accounts. The list of accounts may include all of the accounts the customer registered with the system, or it may include a subset of accounts, based on rules established by the mobile payment network operator, the merchant, the issuer of each payment account, the customer, or another entity (e.g., the list of accounts sent to the mobile device may only include those accounts that may be used for the current transaction). Pursuant to some embodiments, the list of accounts may include only a single account or a plurality of accounts. Further, the list of accounts do not include actual payment credentials—instead, the actual payment credentials are stored at (or accessible to) the transaction management system 130 (or, in some embodiments, the wallet issuer as will be described below). In this way, the mobile device 102 does not store sensitive payment account information. For example, the list of accounts may simply include identifiers (such as proxies) allowing the transaction management system 130 or wallet issuer to identify the actual payment credentials associated with each account of the customer. Now the customer can see on the display 136 of their mobile device 102 the name of the merchant they are about to pay, the amount to be paid, and a list of their payment accounts they can use to pay the merchant 108.

In some embodiments, the merchant's token may be derived from a unique identifier in the merchant payment authorization request. For example, in cases where the merchant can't easily modify their system to pass the transaction management system 130 a static token, such a derivation may reduce or even eliminate the need for equipment upgrades and software changes that might otherwise be required by a merchant adopting a new payment method. The token may be derived using a mapping table which maps a merchant identifier, a terminal identifier, or other information (passed by the merchant system to the transaction management system 130) to a token. Based on the received identifier, a mapping process may occur to identify the appropriate token for use in that payment transaction. The selected token is associated with the transaction in a merchant transaction queue at the transaction management system 130 (or at the token issuing authority as described further below) where it is made available to be matched with transactions from a customer message queue at the transaction management system 130 (or at a wallet issuer as will be described further below). Those skilled in the art will recognize that other matching and mapping techniques may also be used. In either event, the token is an identifier (consisting of a combination of letters, numbers, and/or symbols) used to link a merchant payment authorization request to a payment authorization request received from a customer operating a mobile device pursuant to the present invention.

In embodiments using a "dynamic" token (e.g., where the token is generated by either the merchant 108, the transaction management system 130, or the token issuing authority before it is displayed on a display device associated with the merchant during a checkout transaction, and where the token may include additional information about a transaction), checkout processing may proceed without a need for a customer transaction lookup request message to be transmitted to the transaction management system 130. For example, in some embodiments, some or all of the transaction details may be encoded in a dynamic token which, when captured and processed by the mobile device 102, provides the transaction details to the mobile device 102. Further details of both "static" and "dynamic" token embodiments may be discussed further below or in the commonly assigned applications incorporated by reference herein. In either event, however, the token is used to match messages from the mobile device 102 with messages from the merchant 108 at the transaction management system 130 (or at a combination of a wallet issuer and a token issuing authority as described herein).

To complete the payment transaction, the customer then interacts with the mobile device 102 to select a desired payment account to use in the present transaction, and causes a customer payment authorization request message to be submitted (via path 114) to the transaction management system 130. In some embodiments, the transaction management system 130 transmits a payment authorization request message to the customer's mobile device, enabling the customer to have a final opportunity to confirm or cancel the payment transaction, although this step is optional. The customer's confirmation or cancellation is transmitted from the mobile device 102 as a customer payment authorization message to the transaction management system 130 via path 114.

Once the payment authorization message from the customer's mobile device is received, the transaction management system 130 (or, in some embodiments, a wallet issuer or other entity as will be described further below) creates an authorization approval request message for transmission through one or more payment processing networks (not shown in FIG. 1) to cause the authorization, clearing and settlement of funds for the transaction. This request message includes information from the merchant payment authorization request such as the amount of the transaction, or at least a pointer or reference to the relevant merchant payment authorization request (received from the merchant 108) and a payment account identifier identifying the payment account selected by the customer and previously stored in the transaction management system 130 (and identified by a proxy or other identifier received from the mobile device). The authorization approval processing is performed using standard financial authorization processing over one or more authorization networks (e.g., such as the VISANET® network operated by Visa, Inc., an Automated Clearing House system such as NACHA, or the like, referred to in FIGS. 2, 3 5, and 6 below simply as "payment processing"). Once the availability of funds is confirmed, the transaction management system then sends the merchant payment authorization response message (via path 116) to the merchant so the transaction can be completed at the point of sale. A customer payment authorization response message may also be displayed to the customer at the point of sale and/or transmitted to the customer's mobile device.

Pursuant to some embodiments, as will be described further below, the merchant 108 is not provided with any actual payment credentials of the customer during the checkout process. Further, the mobile device 102 never stores, sends or receives actual payment credentials. Instead, the mobile device 102 stores or has access to a proxy associated with actual payment credentials, and the proxy is used to identify a desired payment account for use in a given transaction. The proxy is transmitted to the transaction management system 130 (or, in some embodiments, to a wallet issuer) in a customer payment authorization request message and the transaction management system 130 (or, in some embodiments, to a wallet issuer) uses the proxy to lookup or identify the actual payment credentials associated with the selected account. The actual payment credentials are then transmitted from the transaction management system 130 (or, in some embodiments, from a wallet issuer) to an account issuer or agent for authorization. By ensuring that actual payment credentials are not revealed to or stored at a merchant 108 or mobile device 102, embodiments provide increased account security and reduced potential for fraud or abuse.

Pursuant to some embodiments, the mobile device 102 may be a smart phone or a Web enabled mobile device such as, for example, an iPhone®, an Android® phone, or any phone that can access and display Web content or access the Internet. In some embodiments, the mobile device 102 communicates with transaction management system 130 using a cellular or wireless network. In some embodiments, the transaction management system 130 is a secure server (or network of servers). In some embodiments, the transaction management system 130 (or, in some embodiments, a wallet issuer and/or token issuing authority) is in communication with one or more payment processing networks (not shown in FIG. 1, but shown in FIGS. 2, 3, 5 and 6 as "payment processing") such as the VISANET® network operated by Visa Inc., the BANKNET® network operated by MasterCard International, or the like. The transaction management system 130 (or, in some embodiments, a wallet issuer and/or token issuing authority) may also be in communication with other financial transaction networks (such as ACH and EFT networks, private label networks, alternative payment systems such as PayPal®, or the like) to allow customers operating mobile devices 102 to conduct transactions using a wide variety of different forms of payment instruments and accounts. The transaction management system 130 (or, in some embodiments, a wallet issuer and/or token issuing authority) may further be in communication with one or more ad or offer management networks, such as those provided by Google®, Apple®, Yahoo®, Microsoft® or the like. As will be described further below, data, including advertisements and offers may be received from those networks and presented to customers via the mobile device 102.

In some embodiments, other devices may obtain a token and/or initiate a transaction. For example, in some embodiments, a customer operating a mobile device 102 may obtain a token for use in a transaction, and then provide that token to another participant in the transaction (such as a merchant, another customer operating another mobile device, or the like). Such a transaction flow may generally proceed as follows.

Pursuant to some embodiments, a transaction (such as a payment, loyalty or other transaction) may be performed by a consumer operating a mobile device 102 to obtain a token from a transaction management system 130 and then presenting the token to a point of interaction (such as a merchant 108, another mobile device, or the like). For example, once the token is obtained by the mobile device 102, the mobile payment application may cause the token (or an encoded version of the token, such as in a QR code or the like) to be displayed on a display screen of the mobile device 102 for reading or capture by the point of interaction, transmitted to the point of interaction via a wireless communication link, or the like. For example, a process at a merchant 108 may proceed as follows (although other process flows may also be used with desirable results).

First, a clerk associated with the merchant 108 may scan items at a POS terminal and create an initial basket or set of items for purchase by a customer operating a mobile device 102 (although the scanning of items may occur after a token is generated and captured, in this illustrative embodiment, for convenience, the scanning of items is described as occurring first). A consumer, operating a mobile device 102 configured with a payment application pursuant to the present invention (and who has registered one or more payment accounts with the transaction management system 130 via a process such as that described below in conjunction with FIG. 4, for example) decides to use the mobile device 102 to conduct the payment transaction at the merchant 108, and interacts with the mobile device 102 to request a token for use in the transaction. This request causes a message to be transmitted to a transaction management system 130. The message may also include information authenticating the consumer as well as the consumer's mobile device (as described above), and the transaction management system 130 uses the data from the message to create a pending transaction record in the transaction queue as well as to generate a token for use in the transaction.

The transaction management system 130 causes a message to be transmitted to the mobile device 102 which includes data associated with the token for use in the transaction. The mobile device 102 (under control of the payment application of the present invention) causes the token to be displayed on a display screen of the mobile device 102. The token may be displayed or presented in the form of a QR code, a bar code, Bluetooth or RFID signal, or the like, and the consumer is prompted to present the token to the merchant clerk or the merchant POS system for capture. The merchant system 108, upon capturing the token from the mobile device 102, associates the token with the pending transaction details (which may include the total transaction amount and other details of the items scanned) and transmits a process transaction request message to the transaction management system 130 which includes the token information as well as information about the transaction (which may include the transaction amount, among other information). For example, the message may include data elements including: information identifying the token (received from the mobile device 102), information identifying the cashier, the POS terminal, the merchant 108, the location, the transaction amount, and line item details of the items purchased. The transaction management system 130 uses the information from the process transaction request message to identify the pending transaction in the transaction queue and updates the transaction queue.

A request message may then be transmitted from the transaction management system 130 to the mobile device 102 which includes information associated with the transaction received from the merchant 108 including the transaction amount. Further, the message may information identifying one or more available payment accounts of the customer which were identified by the transaction management system 130 as being available for use by the customer in the specific transaction (e.g., by applying one or more merchant-specific rules, one or more system-specific rules, and one or more customer account rules). The customer, interacting with the mobile device 102, selects an available payment account from the information received from the transaction management system 130 and causes the selected account information and a transaction confirmation message to be transmitted to the transaction management system 130.

Pursuant to some embodiments, some or all of these messages between the mobile device 102 and the transaction management system 130 may be sent in one or more transaction sessions. That is, a session control is initiated ensuring that the same mobile device 102 both requests the token and receives information about available payment accounts and selects an available payment account in a single transaction session. In this way, embodiments ensure that a different customer or user could not somehow reuse or copy a different user's payment information. In addition, this approach ensures that the mobile device 102 that initiated the request for the token is the only device that can be used to make a payment for the transaction identified in the message sent from the merchant 108 to the transaction management system 130.

The transaction management system 130, upon receipt of the selection of a payment account and confirmation of the transaction, causes a payment authorization request message to be transmitted to payment processing systems (not shown in FIG. 1, but shown in FIGS. 2, 3, 5 and 6). The payment authorization request message includes the actual payment credentials (identified based on the information received from the mobile device 102), the transaction amount, and the merchant information. The transaction management system 130, upon receipt of an authorization response from the payment processing systems, causes a confirmation response message to be transmitted to the merchant 108 (a confirmation response may also be transmitted to the mobile device 102). The pending transaction may also be removed from the transaction queue. In this way, a payment transaction may be performed by allowing a mobile device 102 to obtain a token for use in the transaction and to provide that token to a merchant 108 for use in the transaction. This transaction process may also be used in conjunction with the loyalty, discount, and other types of transactions. Further, the process may be used to conduct transactions at other types of merchant locations (including MOTO, Internet, or the like), at ATM machines or kiosks, and in person to person transactions.

Although the system depicted in FIG. 1 (and elsewhere throughout this disclosure) shows only a single mobile device 102 and merchant 108 those skilled in the art will appreciate that in use there will be a number of devices in use, a number of merchants using the system. Further, pursuant to some embodiments, multiple instances of the transaction management system 130 (and, in some embodiments, wallet issuers and token issuing authorities) in operation.

As will be described further below, transactions conducted using embodiments of the present invention have a number of desirable advantages over existing payment methods. For example, customers are able to conduct payment transactions at a wide variety of merchant locations using their mobile device. Further, the mobile device may be used to access a variety of different payment accounts held by the customer, allowing the customer to select the most appropriate or desirable payment account for each transaction. Using features of the present invention, merchants need not undertake costly hardware retrofit or replacements, as embodiments may utilize existing point of sale systems and hardware. In addition, paying with embodiments of the present invention can be more secure than existing payment methods, as it is possible to require that each transaction be authenticated using two items—user information (such as a user identifier and/or password, or a PIN) known to the customer, as well as unique attributes associated with the mobile device the customer uses to initiate the transaction. Other benefits and advantages will become apparent to those skilled in the art upon reading this disclosure.

Pursuant to some embodiments, the system 100 includes a plurality of transaction management systems 130a-130n. Each (or some) merchant 108 may have an association or relationship with one or more transaction management systems 130a-130n, and the customer operating the mobile device 102 need not know which of the transaction management systems 130a-130n is involved in any given transaction. Similarly, each mobile device 102 may communicate with a number of different transaction management systems 130a-130n, and the merchant or point of transaction need not necessarily know which of the transaction management systems 130a-n is involved in any given transaction prior (until such information is discerned during the transaction as described herein).

As described in the co-pending applications, a purchase or other transaction process pursuant to some embodiments includes the generation, scanning or capturing of a token associated with the point of transaction. In some embodiments, this token may be dynamically generated for use in individual transactions at specific merchants or locations. The scanning or capturing of the token by the mobile device 102 causes information to be transmitted to a transaction management system 130 for use in completing a transaction. Pursuant to some embodiments, data associated with the token may be used in conjunction with identifying or selecting an appropriate payment account for the transaction. As disclosed herein, data associated with the token may also be used to determine which transaction management system 130a-n the mobile device should communicate with in order to retrieve information about a transaction at a merchant (such as, for example, information identifying the amount due, the retailer name, or the like).

Pursuant to some embodiments, the mobile device 102 (or, the merchant 108, in situations where a token is provided from the mobile device 102 to the merchant system in a transaction) can use any of a number of different methods to determine which transaction management system 130a-n to contact during a given transaction. For example, in some embodiments, when the mobile device 102 scans or captures the token at a point of sale, the token may include an identifier or other information that may be used by the mobile payment application to contact the appropriate transaction management system 130a-n. The identifier or other information may be, for example, a URI or URL encoded directly in the token and which is used by the mobile application on the mobile device 102 to determine the path to reach the appropriate transaction management system 130a-n. As an illustrative example, the URL https://paydiant.com/tms/production may be included directly in the token along with the token value itself. In such an embodiment, the URL or URI may be encoded using an URL encoding scheme such that the mobile payment application may efficiently and accurately decode the URL or URI from the token as well as the value of the token.

As another illustrative example of information that may be contained in a token, a formatted URL string may be encoded in a token (e.g., the URL string may be encoded in a QR code, or the like) for capture and processing by a mobile payment application. A formatted URL string may have a structure as follows: https://<hostname/ipaddress>:<port>/<tokenIssuingAuthorityIdentifier>/<issuedToken>/<transactionMetaData>. An example string following this format may be: https://176.64.73.134:8663/pydt/y7uyjhd7/USD/3400. The transaction meta data that may be carried in this string may be, for example (and without limitation) information such as: the currency of the transaction, an amount of the transaction, and a merchant identifier.

As another illustrative example of information that may be contained in a token, a URI based identifier may be encoded in a token (e.g., the URI based identifier may be encoded in a QR code, or the like) for capture and processing by a mobile payment application. The token may be an alpha numeric token such as "3ab0f564-82b5-4846-83a0-604c44989c59". This string could be used to lookup the appropriate transaction management system (or wallet issuer/token issuing authority) for interaction. A tokenized string identifier may also be used. For example, the tokenized string may be formatted in a number of ways, including as an illustrative (but not limiting) example: <tokenIssuingAuthorityIdentifier>:<issuedToken>:<transactionMetaData>.

In a further embodiment, the token may include an identifier that is used to lookup the appropriate path to reach or communicate with the appropriate transaction management system 130a-n. For example, the mobile payment application installed on the mobile device 102 may be provisioned with a lookup table (which may be updated or modified from time to time) with one or more identifier/path pairs. For example, the mobile payment application may store a table such as the example Table I below:

TABLE 1

| Identifier | Path |
| --- | --- |
| ABC123 | https://paydiant.com/tms/production |
| XYZ567 | https://visa.com/tms/production |
| ... | ... |

In the illustrative examples in Table 1, if the mobile device 102 interacts with a merchant 108 that uses the Paydiant transaction management system 130, the token captured by the mobile device 102 from the merchant 108 may include the identifier "ABC123" as well as the value of the token. The mobile device 102, upon receiving the token, performs a lookup to determine that the path to use to communicate with the transaction management system is the path associated with identifier ABC123 (in the example, the appropriate path will be https://paydiant.com/tms/production). If the mobile device interacts with a merchant 108 that uses the Visa transaction management system 130, the token captured by the mobile device 102 from the merchant 108 may include the identifier "XYZ567" as well as the value of the token. The mobile device 102, upon receiving the token, performs a lookup to determine that the path to use to communicate with the transaction management system is the path associated with identifier XYZ567 (in the example, the path will be https://visa.com/tms/production).

In some embodiments, rather than (or in addition to) using a lookup table stored on the mobile device 102, an external service may be used to retrieve the appropriate path. For example, the mobile device 102 may interact with a merchant device 108 and may scan or capture a token presented by the merchant. The token may be encoded to include both an identifier and a token value, and the identifier may be used as a parameter in a web service call made by the mobile device 102 to retrieve the path to the appropriate transaction management system 130*a-n*. In this manner, the mobile device 102 need not store or maintain a lookup table, but need only make a call to a predetermined webservice endpoint that will return the path information associated with a transaction management system identifier. In some embodiments, a combination of a lookup table and a webservice call may be used (e.g., if an identifier is not available or included in a lookup table stored at the mobile device 102, the mobile device 102 may make a call to a webservice endpoint to retrieve the appropriate path information to the transaction management system 130).

In some embodiments, one entity or device (such as a transaction management server, a token issuing authority, or the like) may act as a directory service. For example, a token may encode or contain information including a URI or URL (or other address) to the directory service. When the directory service is contacted with the token value associated with a transaction, the directory service may operate to identify or provide one or more other URIs, URLs (or other addresses) which may be used by a device (such as a mobile device 102, a merchant 108, another transaction management system 130, or the like) to obtain further information associated or usable with the transaction. As an illustrative, but not limiting, example, a directory service contacted about a particular transaction (identified by the token value) may provide a first address at which merchant data associated with the transaction may be obtained, a second address at which transaction receipt data may be obtained (e.g., after completion of the transaction), and a third address at which authorization data associated with the transaction may be obtained. Each of these additional addresses may be obtained by a device or entity having the address of the directory server as well as a valid token value. In some embodiments, interaction with the directory server may be controlled (e.g., such that only authorized entities or devices may obtain the information from the directory service). Additional levels of relationships may also be used. For example, a token issuing authority may provide an address associated with transaction details, and that address may refer to another device or entity for additional transaction details, and that address may refer to additional information associated with the transaction.

In some embodiments, no values from the token itself may be needed to determine the appropriate transaction management system 130 to use. For example, the mobile device 102 or merchant 108 may follow one or more rules based on any number of factors, such as the time of day, day of week, current transaction volume at a point of interaction, dollar amount of a purchase, or any other factor to determine which transaction management system 130 to use. The mobile device 102 or merchant 108 may also have a default transaction management system 130 setting (which defines a default transaction management system 130 to be used in cases where no specific transaction management system 130 is specified in conjunction with a token), and the transaction management system 130 might be able to be changed based on one or more rules that evaluate data that could include one or more data items from the token or a data item from any other data source.

As a further embodiment, the token captured by the mobile device 102 may include an identifier which may be decoded by the mobile payment application on the mobile device 102 to deduce the path to the relevant transaction management system 130*a-n*. For example, an algorithm could be used to convert an identifier received in the token to a path to the appropriate transaction management system 130. As an illustrative example, a simple identifier of "V1P" may be used to construct a path of https://visa.com/1/production based on the following schema: the "V" in the first position of the identifier maps to the domain "visa.com", the "1" in the second position of the identifier maps to a directory having the same name, and the "P" in the third position of the identifier maps to a "production" subdirectory. Similar schemes and mapping may be used to produce a wide variety of URL/URI schemes, allowing the mobile payment application on the mobile device 102 to efficiently identify the correct path to communicate with the appropriate transaction management system 130. Those skilled in the art, upon reading this disclosure, will appreciate that other techniques for determining an appropriate path to a transaction management system may also be used.

In some embodiments, the functions performed by a transaction management system 130 may be performed by one or more entities. For example, in some embodiments, the functions performed by a transaction management system 130 may be performed by a wallet issuer and a token issuing authority. In some embodiments, the functions performed by a wallet issuer may include, for example, functions related to user management, user authentication, and some basic transaction management. The functions performed by a token issuing authority may include, for example, functions related to merchant management, merchant authentication, and some basic transaction management. There may be a number of different wallet issuers (e.g., which issue mobile wallets to a plurality of consumers and which manage user related functions for those consumers) as well as a number of different token issuing authorities (e.g., which interact with different merchants to facilitate transactions pursuant to the present invention). Features of such embodiments will now be described by reference to FIG. 2.

Further details of some aspects of a system according to some embodiments of the present invention will now be described by reference to FIG. 2. FIG. 2 is a block diagram of an example payment system network environment showing communication paths between a mobile device 202, merchants 208, one or more transaction management systems 230 and payment processing systems 232. Mobile device 202 may be, for example, a mobile telephone, PDA, personal computer, or the like. For example, mobile device 202 may be an iPhone® from Apple, Inc., a BlackBerry® from RIM, a mobile phone using the Google Android® operating system, or the like. Pursuant to some embodiments, mobile device 202 may operate a payment application allowing mobile device 202 to operate as a payment device as described herein. In some embodiments, mobile device 202 is capable of accessing and displaying Web content or otherwise accessing the Internet so that a customer operating mobile device 202 may interact with one or more transaction management systems 230 to initiate a transaction via a Web interface.

Mobile device 202 of FIG. 2 can, for example, communicate over one or more wired and/or wireless networks 201. As an example, a wireless network can be a cellular network (represented by a cell transmitter 215). A mobile device 202 may communicate over a cellular or other wireless network and through a gateway 216 and then communicate with a network 214 (e.g., such as the Internet or other public or private network). An access point, such as access point 218 may be provided to facilitate data and other communication access to network 214. Access point 218 may be, for example, compliant with the 802.11g (or other) communication standards. For example, in embodiments in which a mobile device 202 is operating a payment application which allows mobile device 202 to function as a payment device pursuant to the invention, the payment application may cause or control communication of data through network 201 to one or more transaction management systems 230.

In some embodiments, mobile device 202 may engage in both voice and data communications over wireless network 214 via access point 218. For example, mobile device 202 may be able to place or receive phone calls, send and receive emails, send and receive short message service ("SMS") messages, send and receive email messages, access electronic documents, send and receive streaming media, or the like, over the wireless network through access point 218. Similar communications may be made via network 215.

In some embodiments, a mobile device 202 may also establish communication by other means, such as, for example, wired connections with networks, peer-to-peer communication with other devices (e.g., using Bluetooth networking or the like), etc. Mobile device 202 can, for example, communicate with one or more services over networks 201, such as one or more transaction management systems 230 (to conduct payment transactions, to create, edit, view or otherwise modify payment account settings and preferences, etc.), the Web 240, and other services 242. Mobile device 202 can also access other data over the one or more wired and/or wireless networks 201. For example, content providers, such as news sites, RSS feeds, web sites, blogs, social networking sites, developer networks, etc., can be accessed by mobile device 202. Such access can be provided by invocation of a web browsing function or application (e.g., a browser) in response to a customer launching a Web browser application installed on mobile device 202. In some embodiments, a user may utilize a Web browser to interact with one or more transaction management systems 230 to register payment accounts, establish account preferences, perform payment transactions, etc.

Mobile device 202 has a display screen 236 and a data entry device 238 (such as a keypad or touch screen, or voice interface). Pursuant to embodiments of the present invention, the customer may use the mobile device 202 to conduct a purchase transaction with a merchant 208 (or an ATM transaction with an ATM, or any other transaction supported by the system of the present invention). Merchant 208 may be a physical storefront, electronic commerce merchant, or MOTO merchant (or another person or entity). Mobile device 202, in some embodiments, also has a camera (not shown) or other image capture device which allows the mobile device 202 to capture an image or representation of a token 210. Mobile device 202, in some embodiments, also has a wireless receiver (not shown) or other wireless signal receiving device which allows the mobile device 202 to capture a wireless signal representation of a token 210. For example, a customer may operate mobile device 202 to take a digital picture or capture the image of a token 210 displayed on or at a merchant point of sale device to initiate a payment transaction using the present invention. The captured image is shown as item 237 on the display screen 236. As will be described further below, the token 210 may be used to initiate and conduct transactions with a merchant.

Merchant 208 may operate one or more merchant systems 209 to process payments and transactions, including, as will be described, payment transactions pursuant to the present invention (as well as "traditional" or standard payment transactions involving cash, standard payment cards, or the like). Merchant system 209 may be a networked point of sale system (such as for a physical retail location) or it may be a shopping cart system (such as for an electronic commerce or Internet retail location). In the case where the "merchant" is an ATM device, merchant system 209 may further be an ATM network or the like. Merchant system 209 may further be a combination of systems designed to allow a merchant to accept payments for goods or services. In some embodiments, merchant system 209 may be in communication with one or more point of sale devices 212 which have display devices 213 for presenting and receiving information from customers. For example, in the situation where the merchant 208 is a physical retail location, a merchant system 209 may be in communication with a number of different point of sale devices 212 each of which is located at a different checkout lane or location within the store (or in different stores in different geographical locations). Each of the point of sale devices 212 may present, display, or communicate transaction information to customers at the point of sale (or "POS") so that the customer can approve or authorize purchases and present payment for the purchases.

As another example, where the merchant 208 is an Internet or other electronic commerce merchant, the merchant system 209 may be a Web server (or a network of servers, some of which may be Internet accessible) configured to process purchase transactions associated with merchant 208. Point of sale devices 212, in such an example, may be a number of remote terminals interacting with merchant system 209 such as, for example, personal computers, mobile devices, or the like that are able to interact with the merchant system 209 via a network such as the Internet. Because embodiments of the present invention are capable of initiating and conducting transactions for both physical and remote types of merchants, the point of sale, point of purchase, or interaction between a buyer and merchant may be referred to as the "point of sale" or "point of interaction" herein.

Pursuant to embodiments of the present invention, a token 210 is displayed on or near the point of sale. The token 210 may be either a "static" token or a "dynamic" token. In situations where static tokens are used, the token may be printed, displayed, or provided near the point of sale location (such as on a sticker or placard displayed so the customer can easily see and read or capture the token). Static tokens 210 may be printed as a bar code image, as an alphanumeric identifier, or in other forms. In some embodiments, tokens may be presented in forms which are easily discernable by a human so that they may be both key-entered or captured using a mobile device 202. In embodiments where static tokens are used, an additional processing step may be performed (as will be described further below) in order to provide the mobile device 202 with detailed information about the transaction.

In embodiments where dynamic tokens are used, the token may be displayed on a display device 213 associated with a point of sale device 212. A dynamic token may be generated to include transaction information (e.g., such as the purchase amount, etc.) and may, in some embodiments, involve fewer messages between the mobile device 202 and the transaction management system 230 during a payment transaction. The token 210 may be encoded or displayed as a bar code image, as an alphanumeric identifier, as a wireless signal, or in other forms to allow the token 210 to be captured as an image (e.g., using a camera or scanner associated with the mobile device 202). The token 210 may also be key entered by a customer of the mobile device 202 or be captured by a wireless receiver associated with the mobile device 202. In some embodiments, a mobile device may be operated in conjunction with multiple types of tokens 210 (e.g., a mobile application may be capable of capturing a token 210 using image capture, wireless receiving, or key entry, depending on how the token 210 is presented at a point of sale).

The display device 213 could be an LCD (or other display technologies) display (e.g., such as those currently available at many merchants in systems such as the Hypercom 4150 terminal, or the Verifone MX870 terminal or the like). The use of the token 210 in transactions pursuant to the present invention will be described further below. In general, however, the token 210 is used by the transaction management system 230 to match a payment request from a mobile device 202 with a payment authorization request from the merchant 208 to complete a payment transaction using information stored at, or accessible to, the transaction management system 230. In embodiments where the token 210 is a dynamic token, the token may further be used to communicate transaction details from the merchant 208 to the mobile device 202.

In a typical example transaction, a customer may purchase products or services from the merchant 208 by first selecting mobile payment as a payment option, performing an authentication process with a payment application on a mobile device 202 (or via a Web browser interacting with transaction management system 230), capturing a token 210 from a device associated with the merchant 208 (such as from a display 213 of a point of sale device 212), receiving transaction details and a payment account list or list of preferred or eligible accounts from the transaction management system 230, selecting a payment option on the mobile device 202, and submitting a customer payment authorization request to a transaction management system 230 over a network 201.

The selection of a payment option involves receiving information identifying one or more payment accounts available to the customer. The available payment accounts may be those specified by the customer during a registration process such as the process described further below in conjunction with FIG. 4. Pursuant to some embodiments, the presentation of the different payment account options may include applying one or more rules or preferences to a list of available payment accounts so that the customer is presented with the account(s) that are best suited or available for the current transaction. The customer selects the payment account (or accounts, in the case of a split tender transaction) to use and the information is transmitted to the transaction management system 230. In some embodiments, all of the customer's available payment accounts may be displayed to the customer after the customer has been authenticated.

In some embodiments, the list of accounts later received from the transaction management system 230 (after it processes the customer transaction lookup request) may include additional metadata or information associated with each payment account (e.g., such as the current available account balance, any special offers available if the account is used in the current transaction, etc.). In some embodiments, the list of accounts later received from the transaction management system 230 may include fewer accounts based on the application of rules at the transaction management system 230 (e.g., such as the application of one or more customer, merchant or system rules). For example, a rule may specify that a specific payment account not be used for low dollar value transactions. In such a case, that specific payment account would not be included in the list of accounts sent from the transaction management system in response to the customer transaction lookup request. Put another way, the list of payment accounts received from the transaction management system 230 after it processes the customer transaction lookup request may be a subset of all the accounts the customer has registered.

Substantially at the same time, the merchant 208 transmits a merchant payment authorization request message to the transaction management system 230 over a network 220. The transaction management system 230 matches the customer payment authorization request (received from the mobile device 202 over network 201) with the merchant payment authorization request (received from the merchant 208 over network 220) by using the token 210.

In some embodiments where a dynamic token 210 is used, no transaction details need be received by the mobile device 202 from the transaction management system 230—instead, some or all of the transaction details may be provided to the mobile device 202 via data encoded or otherwise contained in the dynamic token 210. In some embodiments, the mobile device 202 requests or receives some or all of the transaction details from the transaction management system even where a dynamic token is used.

In some embodiments, the transaction management system 230 then transmits a customer payment confirmation request message to the customer's mobile device 202, enabling the customer to have a final opportunity to confirm or cancel the payment transaction. For example, the customer may be prompted to "confirm" or "cancel" the payment transaction. The prompt may provide additional information about the transaction and the selected payment account so the customer can have detailed information about the transaction before selecting "confirm" or "cancel". In some embodiments, customers may be given the opportunity to set preferences or otherwise configure the mobile payment application to enable or disable certain messages or transaction steps. As a specific example, customers may be given the opportunity to receive (or not receive) customer payment confirmation request messages.

Once the final confirmation to proceed with the payment has been received from the customer's mobile device 202, the transaction management system 230 creates an authorization approval request message for transmission through one or more payment processing network(s) 232 to cause the authorization, clearing and settlement of funds for the transaction. This request message includes the transaction details, such as the amount of the transaction or other information, from the merchant payment authorization request (received from the merchant 208) and the actual payment credentials associated with the payment account selected by the customer. The actual payment credentials may be obtained by using the payment account selection information and performing a lookup of actual payment account credentials previously stored in a database or location accessible to the transaction management system 230. The authorization approval processing may be performed using standard financial authorization processing over one or more payment processing networks 232 (e.g., such as the VISANET® network operated by Visa, Inc., an Automated Clearing House system such as NACHA, or the like). Once the availability of funds is confirmed, the transaction management system then sends a merchant payment authorization response message to the merchant 208 so the transaction can be completed at the point of sale 212, and a customer payment authorization response message to the customer's mobile device 202.

As described above, similar processing may occur in situations where the mobile device 202 is used to obtain a token from a transaction management system 230, and where the merchant 208 (or other mobile device, or other point of interaction device) captures the token from the mobile device 108.

In some embodiments, a payment system pursuant to the present invention may include multiple entities that perform different processing functions that would normally be provided by one or more transaction management systems as described above. For example, in some situations, it may be desirable for multiple entities (referred to herein as "wallet issuers") to issue and manage mobile payment applications pursuant to the present invention. For example, a financial institution or other entity may choose to issue and manage the task and functions of providing mobile payment applications to its customers. This can result in multiple wallet issuers participating in the payment system of the present invention. Similarly, a financial institution or other entity may choose to provide token issuing functions on behalf of one or more merchants. That is, an entity may have an existing relationship with a merchant and may already have integrated with or access to the merchants point of sale and other merchant systems. The entity may wish to offer token issuing functions to the merchant. This can result in multiple token issuing authorities participating in the payment system of the present invention.

One exemplary system is shown in FIG. 3 which is similar to the system shown in FIG. 2 except that one or more token issuing authorities 250 and one or more wallet issuers 260 are shown instead of a transaction management system 230 (however, in some embodiments, one or more transaction management systems 230 may still be utilized in the system operating in conjunction with the one or more wallet issues 260 and the one or more token issuing authorities 250). As shown in FIG. 3, the wallet issuer 260 may be in communication with a mobile device 202 via one or more network paths. In general, the wallet issuer 260 and each mobile device 202 operating a mobile payment application issued by the wallet issuer 260 may be in communication (for example, the mobile payment application may be coded to ensure reliable interaction and communication between the mobile device 202 and the relevant wallet issuer 260). Further, the token issuing authority 250 is in communication with one or more merchants 208 via one or more network paths. In some transaction embodiments and scenarios, there may further be communication between wallet issuers 260 and token issuing authorities 250 (e.g., to complete a transaction involving both entities). Further, while the wallet issuer 260 is shown as being in communication with one or more payment processing networks 232, in some embodiments, token issuing authorities may also be in communication with one or more payment processing networks 232. Further details of transactions involving these entities will be provided below in conjunction with the discussion of FIG. 5.

Pursuant to some embodiments, before a customer can use a mobile device (such as the mobile device 202 of FIG. 3) to conduct a purchase transaction using the present invention, the customer must perform a registration process such as the process described in conjunction with FIG. 4. Data collected or provided in association with the process 400 may be stored at or be accessible to one or more databases associated with a transaction management system such as system 230. Further, pursuant to some embodiments, a separate wallet issuer 260 may store data collected or provided in association with the process 400.

The registration process 400 of FIG. 4 begins when a customer first (at 402) interacts with a registration server (which may be a component of, or related to, transaction management system 230 of FIG. 2 or wallet issuer 260 of FIG. 3) to initiate a registration process. For example, the customer may operate an Internet browser (either on a mobile device or another computing device) to access a registration Web page associated with the registration server or use functionality in a mobile application to complete the registration process. The registration Web page may request the customer provide some identifying information to begin the account creation process. For example, a customer may provide name, address and other contact information as well as contact preferences, including one or more email addresses and phone numbers. A customer identifier or other unique record (or records) may be established in a database associated with or accessible to a transaction management system 230 or a wallet issuer 260. A customer identifier may be used to uniquely identify the customer. The customer identifier may be an alphanumeric identifier assigned by the transaction management system 230 (or the wallet issuer 260, depending on the embodiment) or may be information based on or provided by the customer (e.g., such as a mobile phone number or identifier associated with a mobile device 202).

Processing continues at 404 where the customer establishes an account relationship with the transaction management system 230 (or the wallet issuer 260, depending on the embodiment). In some embodiments, the account creation includes providing contact and identifying information associated with the customer, as well as information identifying one or more mobile device(s) from which the customer wishes to make transactions. Each mobile device 202 may, for example, be identified by its phone number and/or other unique identifier(s) (such as a hardware serial number, an ASIN, a Advertising Identifier in the case of an iPhone, a component serial number such as a CPU serial number or the like). In some embodiments, where the customer registers from a browser on their mobile device, or by first downloading a payment application having a registration module onto their mobile device, the system may capture unique identifying information associated with the mobile device (e.g., such as a hardware serial number, an ASIN, a Advertising Identifier or other device identifiers).

Processing continues at 406 where the customer provides information about one or more payment devices or payment accounts that the customer wishes to have associated with the payment system of the present invention. Put another way, the customer provides information about one or more payment accounts that the customer wishes to associate with the customer's account relationship with the transaction management system 230 (or wallet issuer 260, depending on the embodiment). For example, the customer may enter information about one or more credit cards, debit cards, gift cards, bank accounts, checking accounts, or the like. The information about each account includes the actual payment credentials or sufficient information to process a transaction using the account. For example, with respect to a credit or debit card, the information may include: the primary account number (or PAN), the expiry date, and the verification code. With respect to a bank account, the information may include: the routing number and the account number. Other information, such as bank or issuer information may also be entered at 406.

As an illustrative example, a customer named "Jane" has entered details about four of her payment accounts that she would like to be able to utilize in conjunction with the present invention, including: a Chase Credit Card, having a primary account number (or "PAN") of #######, and a card expiration date of May 2012, a Webster Bank Checking account having an ABA number of ####### and an account number of ########, a Webster Bank Visa debit card having a PAN of ######## and a card expiration date of June 2011, and a Starbucks gift card having a PAN of ###### and an expiration date of August 2010. Additional account identifying information may be provided as required (e.g., in some embodiments, for payment cards, a card verification number may also be provided). The data obtained during processing 400 may be, for example, securely stored in a PCI compliant database. In some embodiments, by securely storing payment card data (including expiry date and verification codes), payments made using the present invention may qualify for reduced interchange as "card present" transactions. Pursuant to some embodiments, a customer may add, remove or update account information as needed.

Processing continues at 408 where the customer may optionally establish one or more preferences or rules associated with the use of one or more of the accounts entered at 406. For example, the customer may designate one of the accounts as the "primary" or default account. Other rules and preferences may also be set to enable accounts to be selected and used in an efficient and logical manner. For example, a customer may specify priorities or other account-based rules to indicate how a particular payment account should be treated with respect to other payment accounts. A customer may also specify spend limitations or balance requirements that govern how and when a payment account is to be presented as an option. A customer may also specify the order in which accounts are displayed on the mobile phone, based on what merchant they are purchasing from, or the funds available in each account, or the rewards received for using each account.

In some embodiments, a rule (such as a customer-specified rule), may cause a payment process to proceed more quickly, or with fewer customer steps. For example, a customer may specify that when making a purchase (or a certain type of purchase, such as a purchase below a certain dollar amount) at a specific merchant, that a default payment account be used. In such situations, a purchase transaction using the present invention may proceed without need for the customer to select or confirm the selection of a payment account—it is done automatically by application of the customer-specified rule.

Those skilled in the art will appreciate, upon reading this disclosure, that a wide variety and type of account-level rules may be specified to allow a customer to manage how (and when) payment accounts are presented as payment options.

In the illustrative embodiment introduced above, the customer named "Jane" has specified the following account preferences: (i) she wants to reduce the use of credit, and (ii) she wants to reduce transaction fees. Jane has also specified rules to be applied when specific payment accounts are analyzed for use in a given transaction: (i) her Starbucks gift card balance should be used where possible (having been assigned the highest priority), (ii) her checking account or the debit card associated with her checking account should be used as the second highest priority (although she prefers not to use the checking account if a transaction would reduce her balance to below $1,000), and (iii) her credit card should be the final payment option, having the lowest priority.

When Jane uses her mobile device to conduct a transaction using the present invention, the transaction management system 230 (or the wallet issuer 260) will compare the rules and preferences Jane has specified to the details of the transaction to recommend which payment account(s) are available for the transaction. For example, if Jane uses her mobile device to purchase a cup of coffee at Starbucks, the transaction management system will let her know that she can use her Starbucks gift card for the purchase. In this manner, customers having a variety of payment accounts may be presented with choices of payment options that are based on their overall preferences and usage objectives. Further, a payment account that is unavailable or unsuitable for a particular transaction may be identified as such by the transaction management system 230 (or the wallet issuer 260) so that the customer need not be presented with that payment account as an option (e.g., if Jane is purchasing gas at a gas station, she will not be presented with the Starbucks gift card as a payment option for that transaction).

In some embodiments, processing may continue at 410 if the customer operates or uses mobile devices that are capable of operating an application that is associated with the present invention (such as an iPhone or an Android phone). At 410, the customer is prompted to download and install an application on their mobile device. The application allows the customer to operate their mobile device to quickly and easily conduct payment transactions pursuant to the present invention. For phones or devices that are not capable of running such an application, a link or Web page may be created or provided to the customer that may be accessed via a mobile phone browser, so that the customer can conduct payment transactions pursuant to the present invention.

Once a customer has established an account relationship with the transaction management system 230 (or the wallet issuer 260, depending on the embodiment) and registered one or more payment accounts with the transaction management system 230 (or wallet issuer 260), the customer may utilize the system of the present invention to conduct purchase transactions at merchants that support transactions of the present invention.

In some embodiments, such as the embodiment depicted in FIG. 3, different entities, systems or devices may perform different transaction management functions. For example, in some embodiments, there may be multiple wallet issuers 260 and multiple token issuing authorities 250 interacting with multiple transactions involving multiple mobile devices 202 and multiple merchants 208 (or other points of interaction, such as ATMs, other mobile devices, or the like). For example, some consumers may obtain their mobile payment applications on their mobile devices 202 from their financial institution or other entity, and the financial institution or other entity may act as (or use an agent to perform the function of) the wallet issuer 260 for those consumers. Some merchants 208 may choose to interact with certain token issuing authorities 250 but not others. Or, a merchant 208 may use a single token issuing authority 250. Each of these choices result in a combination of entities participating in a given transaction between a consumer and a merchant 208 and pose a technical challenge to allowing all participants to engage in transactions without issues. Embodiments provide systems and methods for allowing transactions to occur despite the potentially large and diverse number of participants.

Reference is now made to FIG. 5 where a further system diagram is shown depicting portions of a system 500 in which a consumer operating a mobile device 102 conducts a transaction with a merchant 108. In the illustrated system 500, the mobile device 102 operates a payment application (which may have been installed and configured through a process such as that shown in FIG. 4) provided by a wallet issuer 260. In the illustrated system, the merchant 108 has a relationship or otherwise interacts with one or more token issuing authorities 250*a*-250*n*. For example, a merchant 108 may have a relationship with one or more entities (such as a financial institution, merchant acquirer, point of sale system vendor, or the like) which it trusts to provide tokens for transactions conducted pursuant to the present invention. In such a system, without features of the present invention, it would be technically challenging to allow a transaction to proceed. Details of some embodiments for allowing a transaction to proceed will now be described by following the processing steps shown in FIG. 5 and which are indicated as items "1"-"6". While only 6 primary interactions are shown, in some embodiments, each interaction may include multiple messages or communications between devices. For convenience and ease of exposition, only the top level interactions are shown in FIG. 5; however, various implementation options will be described in the following.

As shown, a consumer operating a mobile device 102 wishes to conduct a transaction with a merchant 108. For example, the customer may be at a checkout lane of a merchant in which the items to be purchased have been rung up by a clerk, and the customer may have indicated a desire to pay with his mobile application. The selection of the mobile payment option may cause the merchant systems to request a token for the transaction. In the example, the merchant 108 uses several different token issuing authorities 250a-n (for example, the merchant 108 may use token issuing authority 250a for certain types of transactions, and token issuing authority 250b and 250n for others). This is shown for illustrative purposes only—those skilled in the art, upon reading this disclosure, will appreciate that many merchants may interact with only a single token issuing authority 250.

In the illustrative embodiment shown in FIG. 5, the merchant 108 has several relationships, and in the depicted transaction (at the interaction labeled as "1"), requests issuance of a token from token issuing authority 250b. The request may be requested in a message such as a merchant payment authorization request message which transmits information associated with the pending transaction to the token issuing authority 250b. Upon receipt of the merchant payment authorization request message, the token issuing authority 250b generates or otherwise identifies a token for use in the transaction. The token issuing authority 250b may also create a pending transaction record associated with the token. In some embodiments, the pending transaction record may include information including a merchant identifier, a terminal identifier, a transaction amount, and other data associated with the pending transaction. Pursuant to some embodiments, the token generated or obtained by the token issuing authority 250b includes information usable to identify token issuing authority 250b. As discussed above, such information may include a formatted URL string (providing a URL to the token issuing authority 250b as well as other transaction related information in some embodiments), a URI based identifier, a tokenized string identifier, or the like. The token (including the token identifier and the information for identifying the token issuing authority) is returned to the merchant 108 for presentation or communication to the mobile device 102.

Those skilled in the art, upon reading this disclosure, will appreciate that in some embodiments, the token and information for identifying the token issuing authority may also be pre-stored or made available locally at the merchant 108.

The merchant 108 may display or otherwise present the token as a QR code or via other means and the customer may be prompted to capture the token using their mobile device 102 (shown as the interaction at "2"). Once captured, the mobile payment application on the mobile device 102 may be operated to decode the token to obtain the information contained therein (shown as the interaction at "3"). In some embodiments, the decoding of the token may involve cooperative processing between the mobile device 102, the mobile payment application, and the wallet issuer 260 that issued the mobile payment application, or some other device. The decoding of the token can result in any or all of the following: the identification of the particular token issuing authority 250b that issued the token, the actual token value, as well as any meta data provided with the token value.

At this point in the transaction, the token issuing authority 250b has a pending transaction record containing the transaction details received from the merchant 108. The pending transaction record may be identified using the token issued or otherwise provided by the token issuing authority 250b. However, the token issuing authority 250b may not know any information at this point regarding the customer or the payment mechanism to be used by the customer. The customer (via the mobile payment application on the mobile device 102) may have information about the pending transaction to the extent provided in the meta data decoded at "3", and also has a token value as well as information usable to identify the token issuing authority 250b. The wallet issuer 260 has authenticated the customer and the mobile device 102 and also has information associated with the token received or captured by the mobile device 102. In general, at this point, the wallet issuer 260 also knows the identity of the token issuing authority 250b. The wallet issuer 260 may also know certain items of meta data associated with the transaction (if those items were provided in conjunction with the token). For example, consider an illustrative example where the token was encoded with a formatted URL string having the following format: https://<hostname/ipaddress>:<port>/<tokenIssuingAuthorityIdentifier>/<issuedToken>/<transactionMetaData>. The string received by the mobile device 102 at "2" and decoded at "3" may reveal the following formatted URL string: https://176.64.73.134:8663/pydt/y7uyjhd7/USD/34000/MID01001, which allows the mobile device 102, the mobile payment application, and the wallet issuer 260 to discern that the appropriate token issuing authority 250b to interact with is a token issuing authority accessible at https://176.64.73.134:8663 and identified as "pydt". The token usable to identify the pending transaction record is "y7uyjhd7" and the transaction is in US Dollars in the amount of $3,400 at a merchant identified as "MID01001". Further, the wallet issuer 260 may have location and other data received from the mobile device 102.

In some embodiments, processing at "3" may not result in the mobile device 102 having transaction information. For example, in some embodiments, the token obtained at "2" from the merchant 108 may not include meta data (such as data identifying a transaction amount, or the like). In such situations, one or more further interactions may be required. For example, one such further interaction is shown as interaction "4" where the mobile device 102 interacts with the wallet issuer 260 with a request for transaction details. Processing at "4" may include the mobile device 102 providing the wallet issuer 260 with the token value as well as information usable to identify the token issuing authority 250b. The wallet issuer 260 may issue a request to the token issuing authority 250b requesting transaction details associated with the pending transaction record associated with the token value obtained by the mobile device 102 at "2". Once processing at "4" (in the case where the token obtained at "2" had no or insufficient meta data associated with the transaction), or processing at "3" (in the case where the token obtained at "2" did have sufficient meta data associated with the transaction), the processing may continue as described below.

The wallet issuer 260, interacting with the mobile payment application on the mobile device 102 may proceed to perform processing to determine which payment account(s) of the customer may be used in the transaction. For example, the wallet issuer 260, which stores the customer's preferences and rules, may determine that only several payment accounts of the customer are available for use at the merchant identified by "MID01001" (or based on the merchant type and location). The wallet issuer 260 may also determine that only certain payment accounts are available for use to complete transactions in US Dollars in the amount of $3,400. The wallet issuer 260 may interact with the mobile payment application to inform the customer which payment accounts are available for use in the pending transaction and obtain a customer selection of one or more payment accounts for use in completing the transaction.

Once the customer has selected the desired account and has confirmed or accepted the transaction on their mobile device 102, processing may proceed with an interaction "5" where either the mobile device 102, the wallet issuer 260 or a combination of the mobile device 102 and the wallet issuer 260 communicate with the token issuing authority 250b to obtain a transaction authorization from one or more payment processing networks 280 for the transaction and provide the transaction authorization to the appropriate token issuing authority 250b. Such interaction at "5" may involve a number of messages. For example, once the customer has selected a desired payment account(s) for use in completing the transaction, a message is transmitted identifying the desired payment account(s) to the wallet issuer 260 (which message, according to some embodiments, does not include actual payment account credentials but rather a proxy or identifier usable by the wallet issuer 260 to retrieve or identify the actual payment account credentials). The wallet issuer 260 constructs a payment authorization request message with information including: the actual payment account credentials (such as a PAN, account number, validation or verification data, expiry date, etc.), the transaction amount, and the merchant identifier. The payment authorization request message is then transmitted to one or more payment networks for authorization processing. If the transaction is authorized, the wallet issuer 260 may receive an authorization code and authorization response message, which are then transmitted to the appropriate token issuing authority 250b along with the token.

The token issuing authority 250b, upon receipt of the authorization code and authorization response, uses the received token to identify the pending transaction record and performs processing (at "6") to interact with the merchant 108 to complete the transaction. For example, in situations where the payment is authorized, the token issuing authority 250b may transmit information confirming the transaction was successfully completed so the merchant 108 can cause a transaction receipt to be printed at the point of interaction. The wallet issuer 260 may also cause a transaction receipt or other information to be transmitted to the mobile device 106.

In some situations, it may not be possible for the wallet issuer 260 to obtain a payment authorization from the payment processing networks 280 based on the information available to the wallet issuer 260. For example, in some embodiments, the token issuing authority 250 may not provide additional metadata associated with a transaction (such as a merchant identifier and/or a transaction amount). In such cases, embodiments may be provided in which further communication between the wallet issuer 260 and the token issuing authority 250 may be required. For example, in some embodiments, once the wallet issuer 260 has obtained a token from the mobile device 102, the wallet issuer 260 may establish communication with the token issuing authority 250 to obtain the missing meta data (including, for example, a merchant identifier and transaction amount). The wallet issuer 260 may then proceed as above and obtain a payment authorization from the payment processing networks 280.

In a still further embodiment for the situation where it is not possible for the wallet issuer 260 to obtain a payment authorization from the payment processing networks 280 based on the information available to the wallet issuer 260, the token issuing authority 250 may obtain the payment authorization. For example, in some embodiments, the wallet issuer 260, upon identifying the appropriate payment account credential(s) for use in the transaction may pass those payment account credential(s) to the token issuing authority 250 (along with the token), thereby allowing the token issuing authority to construct a payment authorization message with the information from the pending transaction record as well as the payment account credential(s) received from the wallet issuer 260. In either situation, the ability to complete a transaction is based on providing the mobile device 102 and the wallet issuer 260 with information usable to identify the transaction (the token) as well as information usable to identify the token issuing authority 250 (the information such as a URL, URI or other data provided with the token).

Figure 6:
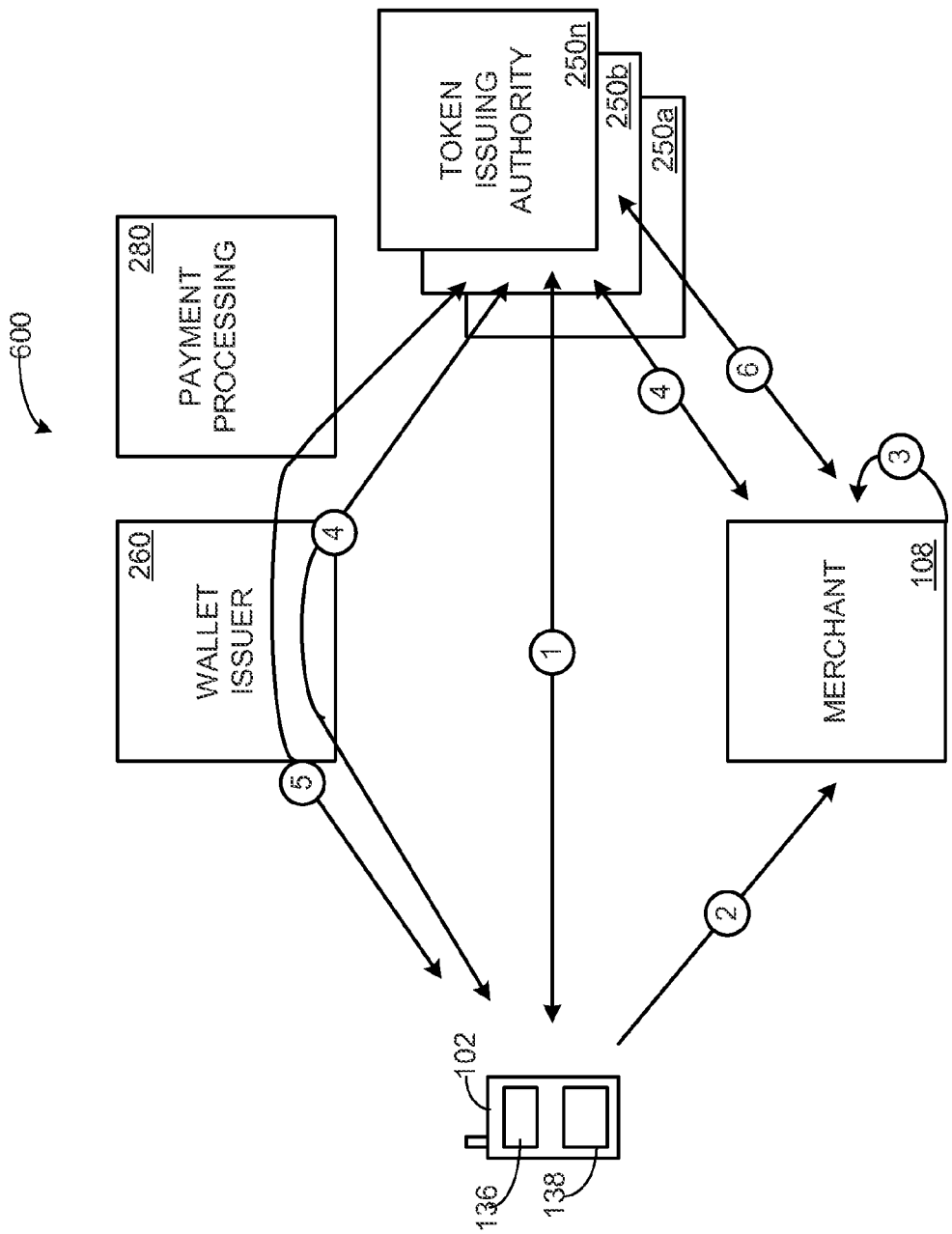
FIG. 6 is a block diagram depicting portions of a system configured pursuant to some embodiments.

As described above, in some embodiments a mobile device 102 may be operated to obtain a token, and the token may then be provided to a merchant 108 (or to another device or participant in a transaction). In such embodiments, it is possible that different entities, systems or devices may perform different transaction management functions. Reference is now made to FIG. 6 where one illustrative system will be described. As with the embodiment described above in conjunction with FIG. 5, there may be multiple wallet issuers 260 and multiple token issuing authorities 250 interacting with multiple transactions involving multiple mobile devices 202 and multiple merchants 208 (or other points of interaction, such as ATMs, other mobile devices, or the like).

In FIG. 6, a further system diagram is shown depicting portions of a system 600 in which a consumer operating a mobile device 102 conducts a transaction with a merchant 108. In the illustrated system 600, the mobile device 102 operates a payment application (which may have been installed and configured through a process such as that shown in FIG. 4) provided by a wallet issuer 260. In the illustrated system, the mobile device 102 obtains the token from a token issuing authority 250b (in the transaction labeled as item "1"). In some embodiments, a user and device authentication process may occur in conjunction with or prior to interaction "1" (e.g., where the user and the device are authenticated by the wallet issuer 260). In some embodiments, when the mobile device 102 makes a request for a token from token issuing authority 250b, it may also provide information usable by the token issuing authority 250b to communicate with the mobile device 102 (which will allow the token issuing authority 250b to transmit transaction details to the mobile device 102 in a message to be described below and labeled as item "4"). Upon receipt of the request for the token, the token issuing authority 250b may create a pending transaction record associated with the token. In some embodiments, the pending transaction record may include information including a wallet issuer identifier (for use in identifying the wallet issuer 260 associated with the mobile payment application of the mobile device 102), a customer identifier, and other data associated with the pending transaction. Pursuant to some embodiments, the token generated or obtained by the token issuing authority 250b includes information usable to identify token issuing authority 250b. As discussed above, such information may include a formatted URL string (providing a URL to the token issuing authority 250b as well as other transaction related information in some embodiments), a URI based identifier, a tokenized string identifier, or the like. The token (including the token value and the information for identifying the token issuing authority and, in some embodiments, some additional meta data) is returned to the mobile device 102 for presentation or communication to the merchant 108.

The mobile device 102 may display or present the token as a QR code (or present it via a wireless signal like Bluetooth, NFC or the like) and the merchant 108 may be may be prompted to capture the token (e.g., using a scanner or other reader) (shown as the interaction at "2"). Once captured, the merchant 108 may decode the token to obtain the information contained therein (shown as the interaction at "3"). In some embodiments, the decoding of the token may involve cooperative processing between the merchant 108 and another entity. The decoding of the token can result in any or all of the following: the identification of the particular token issuing authority 250b that issued the token, the actual token value, as well as any meta data provided with the token value.

The merchant 108 may then perform processing to generate and transmit a merchant payment authorization request message to the token issuing authority 250b identified in the token (e.g., via interaction "4"). The merchant payment authorization request message may transmit information associated with the pending transaction to the token issuing authority 250b, as well as the token value obtained from the interaction at "2" and "3". The information may include a merchant identifier, terminal identifier, transaction amount, and other data associated with the pending transaction.

At this point in the transaction, the token issuing authority 250b has a pending transaction record containing the information received from the mobile device 102, and pending transaction data containing the information received from the merchant 108. The pending transaction record may be identified using the token value issued or otherwise provided by the token issuing authority 250b to the mobile device 102 (and which was then communicated to the merchant 108). The token issuing authority 250b may also have information usable to communicate information to the mobile device 102 (e.g., including information allowing direct communication with the mobile device 102 and/or information allowing communication with the mobile device 102 through the wallet issuer 260 associated with the mobile device 102, any or all of which information may which may have been obtained in the interaction labeled as item "1"). However, the token issuing authority 250b may not know any information at this point regarding the payment mechanism to be used by the customer. Further, at this point, the mobile device 102 may not have any transaction details (including information associated with the merchant, the transaction amount, or the like). In some embodiments, the token issuing authority 250b causes a further message associated with interaction "4" to occur. The further message is a message between the token issuing authority 250b and the mobile device 102. In some embodiments, this message may be routed through the wallet issuer 260 associated with the mobile device 102 as shown in FIG. 6, while other embodiments may allow direct communication between the token issuing authority 250b and the mobile device 102.

Once the mobile device 102 (and, in some embodiments, the wallet issuer 260) has information associated with the pending transaction (including, for example, information identifying the merchant 108, the transaction amount, and the like), processing may continue with an interaction labeled as "5".

In processing during the interaction shown as item "5", the wallet issuer 260, interacting with the mobile payment application on the mobile device 102 may proceed to perform processing to determine which payment account(s) of the customer may be used in the transaction. For example, the wallet issuer 260, which stores the customer's preferences and rules, may determine that only several payment accounts of the customer are available for use at the merchant (or based on the merchant type and location). The wallet issuer 260 may interact with the mobile payment application to inform the customer which payment accounts are available for use in the pending transaction and obtain a customer selection of one or more payment accounts for use in completing the transaction.

Once the customer has selected the desired account and has confirmed or accepted the transaction on their mobile device 102, processing of interaction "5" may proceed where either the mobile device 102, the wallet issuer 260 or a combination of the mobile device 102 and the wallet issuer 260 communicate to obtain a transaction authorization from one or more payment processing networks 280 for the transaction and provide the transaction authorization to the appropriate token issuing authority 250b. Such interaction at "5" may involve a number of messages. For example, once the customer has selected a desired payment account(s) for use in completing the transaction, a message is transmitted identifying the desired payment account(s) to the wallet issuer 260 (which message, according to some embodiments, does not include actual payment account credentials but rather a proxy or identifier usable by the wallet issuer 260 to retrieve or identify the actual payment account credentials). The wallet issuer 260 constructs a payment authorization request message with information including: the actual payment account credentials (such as a PAN, account number, validation or verification data, expiry date, etc.), the transaction amount, and the merchant identifier. The payment authorization request message is then transmitted to one or more payment networks for authorization processing. If the transaction is authorized, the wallet issuer 260 may receive an authorization code and authorization response message, which are then transmitted to the appropriate token issuing authority 250b along with the token.

The token issuing authority 250b, upon receipt of the authorization code and authorization response, uses the received token to identify the pending transaction record and performs processing (at "6") to interact with the merchant 108 to complete the transaction. For example, in situations where the payment is authorized, the token issuing authority 250b may transmit information confirming the transaction was successfully completed so the merchant 108 can cause a transaction receipt to be printed at the point of interaction. The wallet issuer 260 may also cause a transaction receipt or other information to be transmitted to the mobile device 106.

In some situations, it may not be possible for the wallet issuer 260 to obtain a payment authorization from the payment processing networks 280 based on the information available to the wallet issuer 260. For example, in some embodiments, the token issuing authority 250 may not provide additional metadata associated with a transaction (such as a merchant identifier and/or a transaction amount), or may not have provided the additional transaction information to the mobile device 102 and wallet issuer 260 in conjunction with the interaction at "4". In such cases, embodiments may be provided in which further communication between the wallet issuer 260 and the token issuing authority 250 may be required. For example, in some embodiments, once the wallet issuer 260 has obtained a token from the mobile device 102, the wallet issuer 260 may establish communication with the token issuing authority 250 to obtain the missing meta data (including, for example, a merchant identifier and transaction amount). The wallet issuer 260 may then proceed as above and obtain a payment authorization from the payment processing networks 280.

In a still further embodiment for the situation where it is not possible for the wallet issuer 260 to obtain a payment authorization from the payment processing networks 280 based on the information available to the wallet issuer 260, the token issuing authority 250 may obtain the payment authorization. For example, in some embodiments, the wallet issuer 260, upon identifying the appropriate payment account credential(s) for use in the transaction may pass those payment account credential(s) to the token issuing authority 250 (along with the token), thereby allowing the token issuing authority to construct a payment authorization message with the information from the pending transaction record as well as the payment account credential(s) received from the wallet issuer 260. In either situation, the ability to complete a transaction is based on providing the mobile device 102 and the wallet issuer 260 with information usable to identify the transaction (the token) as well as information usable to identify the token issuing authority 250 (the information such as a URL, URI or other data provided with the token).

Embodiments allow processing to occur in systems having multiple transaction management systems and further to allow processing to occur in systems having multiple entities performing different aspects of transaction management (such as wallet issuers and token issuance) and allow mobile devices to easily and efficiently identify which transaction management system (or other device or entity) to communicate with as well as the path or communication channel to use to interact with the relevant transaction management system (or other device or entity) for each specific transaction.

In this manner, embodiments allow a wide variety of different transaction management systems and other entities and devices to be used in a payment system of the present invention, and allow mobile devices participating in the payment system to correctly identify and determine which transaction management system (or other device or entity) to communicate with to complete a transaction pursuant to the present invention based on information captured in a checkout token obtained at a point of transaction.

The above descriptions of processes herein should not be considered to imply a fixed order for performing the process steps. Rather, the process steps may be performed in any order that is practicable, including simultaneous performance of at least some steps. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for operating a device associated with a first party to identify a second party participating in a transaction with the first party, the method comprising:
    obtaining a token for use in said transaction, said token including information usable to identify a communication path to one of a plurality of token issuers and a value of said token; and
    providing said token to a second device associated with said second party;
    wherein said second device transmits said value of said token to said one of said plurality of token issuers with information usable to identify said second party.

2. The method of claim 1, wherein said obtaining said token further comprises:
    receiving, in response to a request to a token issuer, a token for use in said transaction.

3. The method of claim 1, wherein said token data further includes meta data associated with said token.

4. The method of claim 3, wherein said meta data associated with said token includes information identifying at least one of: (i) an amount of said transaction, (ii) a currency type of said transaction.

5. The method of claim 4, wherein said meta data associated with said token includes information identifying at least one of an address and a resource identifier usable to obtain at least one of: (i) details of said transaction, (ii) offers associated with said transaction, and (iii) a receipt for said transaction when said transaction is completed.

6. The method of claim 1, wherein said first party is a customer and said second party is a merchant.

7. The method of claim 1, wherein said first party is a merchant and said second party is a customer.

8. The method of claim 1, wherein said first party is a first individual and said second party is a second individual.

9. The method of claim 1, wherein said information usable to identify said communication path to said one of said token issuers uniquely identifies one of said plurality of token issuers.

10. A method for operating a device associated with a first party to perform a transaction between the first party and a second party, the method comprising:
    obtaining, by said device, a token associated with said transaction;
    processing said token to determine token data, said token data including an identifier usable to identify a communication path to one of a plurality of token issuers and a value of said token;
    transmitting, to a wallet issuer, information including at least said token data; and
    transmitting, to said wallet issuer, a request to complete said transaction, wherein said wallet issuer performs processing to obtain an authorization of said transaction using an account of said first party and provides information associated with said authorization to said one of said plurality of token issuers for use in completing said transaction.

11. The method of claim 10, wherein said obtaining said token further comprises:
    causing said token to be captured by the device associated with the first party, the token presented to the first party by said second party.

12. The method of claim 10, wherein said obtaining said token further comprises:
    receiving, in response to a request to a token issuer, a token for use in said transaction.

13. The method of claim 10, wherein said token data further includes meta data associated with said token.

14. The method of claim 13, wherein said meta data associated with said token includes information identifying at least one of: (i) an amount of said transaction, (ii) an identifier of said second party to said transaction, and (iii) a currency type of said transaction.

15. The method of claim 14, wherein said meta data associated with said token includes information identifying at least one of an address and a resource identifier usable to obtain at least one of: (i) details of said transaction, (ii) offers associated with said transaction, and (iii) a receipt for said transaction when said transaction is completed.

16. The method of claim 10, further comprising:
    transmitting, to said wallet issuer, information for authenticating said first party; and
    transmitting, to said wallet issuer, information associated with said transaction;
    wherein said wallet issuer determines, based at least in part on said authenticating said first party and said information associated with said transaction, said account for use in completing said transaction.

17. The method of claim 16, wherein said wallet issuer obtains said authorization for said transaction using said information associated with said transaction and said account.

18. The method of claim 16, wherein said information associated with said transaction is obtained, at least in part, from said token data.

19. The method of claim 10, wherein said wallet issuer provides information associated with said authorization to said one of said plurality of token issuers using said identifier usable to identify said communication path to said one of said plurality of token issuers and said value of said token.

20. The method of claim 10, further comprising:
transmitting, to said wallet issuer, information associated with said transaction including said token;
receiving, from said wallet issuer, information identifying at least a first available account of said first party for use in completing said transaction; and
transmitting, to said wallet issuer, a request to complete said transaction using said at least first available account.

21. The method of claim 20, further comprising:
transmitting, to said wallet issuer, information for authenticating said first party.

22. The method of claim 10, wherein said first party is a customer and said second party is a merchant.

23. The method of claim 10, wherein said first party is a first individual and said second party is a second individual.

24. The method of claim 10, wherein said identifier usable to identify said communication path to said one of said token issuers uniquely identifies said one of said plurality of token issuers.

25. A method for conducting a transaction between a first party operating a first device and a second party operating a second device, the method comprising:
initiating a transaction using said first device;
capturing, using said second device, a token associated with said transaction;
determining, based on information associated with said token, one of a plurality of transaction management systems associated with said transaction, wherein said information associated with said token includes information to identify a communication path to said one of said plurality of transaction management systems; and
transmitting said token and information associated with said token to said one of said plurality of transaction management systems for use in completing said transaction.

26. The method of claim 25, wherein said one of said plurality of transaction management systems is a directory server, said directory server identifying, based on information associated with said token, at least a first resource for use in completing said transaction.

27. The method of claim 26, wherein said at least first resource for use in completing said transaction is at least one of an address and a resource identifier usable to obtain at least one of: (i) details of said transaction, (ii) offers associated with said transaction, (iii) a receipt for said transaction when said transaction is completed, (iv) a wallet issuer associated with an account of said first party, and (v) a wallet issuer associated with an account of said second party.

28. A non-transitory, computer-readable medium storing instructions adapted to be executed by a computer processor of a first device associated with a first party to perform a method to identify a second party participating in a transaction with said first party, said method comprising:
obtaining a token for use in said transaction, said token including information usable to identify a communication path to one of a plurality of token issuers and a value of said token; and
providing said token to a second device associated with said second party;
wherein said second device transmits said value of said token to said one of said plurality of token issuers with information usable to identify said second party.

29. The medium of claim 28, wherein said token further includes meta data associated with said token identifying at least one of (i) an amount of said transaction, (ii) a currency type of said transaction.

30. The medium of claim 28, wherein said token further includes meta data associated with said token identifying at least one of an address and a resource identifier usable to obtain at least one of: (i) details of said transaction, (ii) offers associated with said transaction, and (iii) a receipt for said transaction when said transaction is completed.

31. A system for conducting a transaction, comprising:
a communication device to receive information associated with a request to initiate a transaction involving a first party operating a first device and a second party operating a second device, said request to initiate received from said first device;
a computer processor for executing program instructions; and
a memory, coupled to the computer processor, for storing program instructions for execution by the computer processor to:
establish a pending transaction record associated with said transaction;
generate token data associated with said pending transaction record, said token data including an identifier usable to identify a communication path to said system from among a plurality of systems and a value of said token;
transmit said token to said first device;
receive, from at least one of said second device and a device associated with said second device, an authorization of said transaction; and
transmit information associated with said authorization of said transaction to at least one of said first device and said second device.

32. The system for conducting a transaction of claim 31, wherein said second device is a mobile device, and said device associated with said second device is an issuer of a wallet on said mobile device.

33. The system for conducting a transaction of claim 32, wherein said authorization is obtained by said issuer of said wallet after transmission of a transaction authorization request message to a payment system.

34. The system for conducting a transaction of claim 33, wherein said transaction authorization request message includes information identifying an account of said second party, information identifying an amount of said transaction, and information identifying said first party.

35. A method for operating a device to facilitate a transaction between a first party and a second party, the method comprising:
receiving, from a first device associated with said first party, a request for a token for use in said transaction, said request including information usable to identify said first party;

providing, to said first device, said token, wherein said token includes information usable to identify a communication path to said device from among a plurality of devices and a value of said token;

receiving, from a second device associated with said second party, a request to participate in said transaction, said request including said value of said token and information usable to identify said second party; and associating said information usable to identify said first party, said information usable to identify said second party, and said value of said token to facilitate said transaction.

\* \* \* \* \*